(12) United States Patent
Jain et al.

(10) Patent No.: US 11,734,580 B2
(45) Date of Patent: Aug. 22, 2023

(54) BUILDING ANALYTICAL PLATFORM TO ENABLE DEVICE FABRICATION

(71) Applicant: Tata Consultancy Services Limited, Mumbai (IN)

(72) Inventors: Deepak Jain, Pune (IN); Sapankumar Hiteshchandra Shah, Pune (IN); Beena Rai, Pune (IN); Pritwish Mitra, Pune (IN); Sreedhar Reddy, Pune (IN); Neelanshi Wadhwa, Pune (IN); Sarath Sasidharan, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 329 days.

(21) Appl. No.: 17/323,760

(22) Filed: May 18, 2021

(65) Prior Publication Data

US 2021/0365634 A1 Nov. 25, 2021

(30) Foreign Application Priority Data

May 19, 2020 (IN) .............................. 202021021081

(51) Int. Cl.
*G06N 5/022* (2023.01)
*G06F 16/93* (2019.01)
(Continued)

(52) U.S. Cl.
CPC ......... *G06N 5/022* (2013.01); *G06F 16/9024* (2019.01); *G06F 16/93* (2019.01);
(Continued)

(58) Field of Classification Search
CPC .... G06F 40/258; G06F 40/295; G06F 40/289; G06F 40/279; G06F 40/30
See application file for complete search history.

(56) References Cited

U.S. PATENT DOCUMENTS 6,965,895 B2 11/2005 Smith et al.
2005/0004780 A1 1/2005 Lin et al.
(Continued)

FOREIGN PATENT DOCUMENTS

WO WO-2019050968 A1 * 3/2019

OTHER PUBLICATIONS

Leber, Christian et al., "Knowledge-based expert system in manufacturing planning: state-of-the-art review", Journal, 2018, Tandfonline, https://fardapaper.ir/mohavaha/uploads/2018/09/Fardapaper-Knowledge-based-expert-system-in-manufacturing-planning-state-of-the-art-review.pdf.
(Continued)

*Primary Examiner* — Samuel G Neway
(74) *Attorney, Agent, or Firm* — Finnegan, Henderson, Farabow, Garrett & Dunner LLP

(57) ABSTRACT

This disclosure relates generally to methods and systems for building an intelligent analytical platform to enable a device fabrication in material science. Material engineers and design engineers may face various challenges with existing knowledge, as more time and efforts are required in finding a relevant knowledge from the existing knowledge, mainly due to the unstructured form, for fabricating new devices. The present disclosure solves the technical problem of finding the relevant knowledge out of the existing knowledge, in a structured form by building an analytical platform. The unstructured format of the existing knowledge of the fabrication process is transformed into a structured format in terms of operation sequence knowledge graphs, using a set of artificial intelligence (AI) and machine learning models,
(Continued)

and a knowledge representation model of the fabrication process. The structured format of the existing knowledge is hierarchically arranged to build the analytical platform.

17 Claims, 11 Drawing Sheets

(51) Int. Cl.

| | | |
|---|---|---|
| G06F 16/901 | (2019.01) | |
| G06F 40/289 | (2020.01) | |
| G06N 3/08 | (2023.01) | |
| G06F 40/258 | (2020.01) | |
| G06F 40/295 | (2020.01) | |
| G06F 40/30 | (2020.01) | |
| G06F 40/279 | (2020.01) | |

(52) U.S. Cl.
CPC .......... *G06F 40/258* (2020.01); *G06F 40/279* (2020.01); *G06F 40/289* (2020.01); *G06F 40/295* (2020.01); *G06F 40/30* (2020.01); *G06N 3/08* (2013.01)

(56) References Cited

U.S. PATENT DOCUMENTS

| | | | |
|---|---|---|---|
| 2011/0113069 A1* | 5/2011 | Morgan | G06F 40/289 707/794 |
| 2016/0314278 A1* | 10/2016 | Mabotuwana | G16H 30/40 |
| 2021/0248420 A1* | 8/2021 | Zhong | G06V 10/82 |
| 2021/0295822 A1* | 9/2021 | Tomkins | G06F 16/90332 |
| 2021/0365634 A1* | 11/2021 | Jain | G06F 40/295 |

OTHER PUBLICATIONS

Chen, W.L. et al., "A new process knowledge representation approach using parameter flow chart", Computers in Industry, 2011, vol. 62, Issue: 1, pp. 9-22, Publisher: Elsevier, https://www.sciencedirect.com/science/article/abs/pii/S0166361510000898#~:/text=The%20approach%20based%20on%20PFC.chart%20technology%2C%20and%20visual%20technology.&text=From%20this%20point%2C%20PFC%20helps.and%20intelligibility%20of%20process%20knowledge.

* cited by examiner

BUILDING ANALYTICAL PLATFORM TO ENABLE DEVICE FABRICATION

PRIORITY CLAIM

This U.S. patent application claims priority under 35 U.S.C. § 119 to: Indian Patent Application No. 202021021081, filed on 19 May 2020. The entire contents of the aforementioned application are incorporated herein by reference.

TECHNICAL FIELD

The disclosure herein generally relates to knowledge processing in material science, and, more particularly, to methods and systems for building an intelligent analytical platform to enable a device fabrication in material science.

BACKGROUND

In material science, functional materials that host different materials including inorganic materials, organic materials and hybrid materials, form a basis for fabricating different type of devices (herein after referred as a 'device fabrication') such as solar cells, lithium ion batteries, and so on. During the device fabrication, more than one functional material may be subjected to various operations such as cleaning, heating and so on, based on a fabrication procedure, under specific operating conditions, before finally being characterized for obtaining desired performance of the device. A large amount of knowledge related to the device fabrication of each device is available in literature including publications, reports, documents, experimental thesis, and so on. However, most of the existing knowledge related to the device fabrication is present in an unstructured form. Material engineers and design engineers may face various challenges with the existing knowledge, as more time and efforts are required to find relevant knowledge from the existing knowledge, mainly due to the unstructured form, for fabricating new devices.

SUMMARY

Embodiments of the present disclosure present technological improvements as solutions to one or more of the above-mentioned technical problems recognized by the inventors in conventional systems.

In an aspect, a processor-implemented method for building an analytical platform to enable a device fabrication is provided. The method including the steps of: receiving (i) a device category associated with a device fabrication, (ii) one or more device fabrication knowledge documents associated with the device category from a device fabrication knowledge repository, wherein each device fabrication knowledge document comprises a plurality of document paragraphs, wherein each document paragraph comprises one or more paragraph sentences, and each paragraph sentence comprises a plurality of paragraph sentence words; pre-processing each device fabrication knowledge document of the one or more device fabrication knowledge documents, to obtain: (i) a plurality of pre-processed document paragraphs, in a plain text format, (ii) a section header for each pre-processed document paragraph of the plurality of pre-processed document paragraphs, wherein each pre-processed document paragraph comprises a plurality of pre-processed paragraph sentences, and wherein each pre-processed paragraph sentence comprises a plurality of pre-processed paragraph sentence words; identifying one or more fabrication procedure paragraphs out of the plurality of pre-processed document paragraphs, by a trained fabrication procedure paragraph classification model, using the section header for each pre-processed document paragraph of the plurality of pre-processed document paragraphs, wherein each pre-processed document paragraph of the plurality of pre-processed document paragraphs is a fabrication procedure paragraph, if the pre-processed document paragraph comprises information related to a fabrication procedure; identifying one or more entities, for each pre-processed paragraph sentence of the plurality of pre-processed paragraph sentences associated with each fabrication procedure paragraph of the one or more fabrication procedure paragraphs, by a trained named entity identification model, wherein the plurality of entities are associated with a plurality of predefined concepts related to the fabrication procedure; identifying (i) one or more first predefined relations out of a first set of predefined relations, and (ii) one or more second predefined relations out of a second set of predefined relations, for each pre-processed paragraph sentence of the plurality of pre-processed paragraph sentences associated with each fabrication procedure paragraph of the one or more fabrication procedure paragraphs, by (i) a trained relation identification model, and (ii) a set of predefined pattern expressions, respectively, using the one or more entities identified for each pre-processed paragraph sentence; identifying a device fabrication procedure for each fabrication procedure paragraph of the one or more fabrication procedure paragraphs, by a rule based unsupervised algorithm, using the one or more entities identified for each pre-processed paragraph sentence of the plurality of pre-processed paragraph sentences associated with each fabrication procedure paragraph, wherein the device fabrication procedure for each fabrication procedure paragraph, comprises a sequence of operations; generating an operation sequence knowledge graph for each fabrication procedure paragraph of the one or more fabrication procedure paragraphs, using (i) the one or more entities identified for each pre-processed paragraph sentence of the plurality of pre-processed paragraph sentences associated with each fabrication procedure paragraph of the one or more fabrication procedure paragraphs, (ii) (a) the one or more first predefined relations out of the first set of predefined relations, and (b) the one or more second predefined relations out of the second set of predefined relations, identified for each pre-processed paragraph sentence of the plurality of pre-processed paragraph sentences associated with each fabrication procedure paragraph of the one or more fabrication procedure paragraphs, and (iii) the device fabrication procedure for each fabrication procedure paragraph of the one or more fabrication procedure paragraphs, using a graph database tool; and building the analytical platform to enable the device fabrication, using the operation sequence knowledge graph for each fabrication procedure paragraph of the one or more fabrication procedure paragraphs, in a graph search engine.

In another aspect, a system for building the analytical platform to enable the device fabrication is provided. The system includes: a memory storing instructions; one or more Input/Output (I/O) interfaces; and one or more hardware processors coupled to the memory via the one or more I/O interfaces, wherein the one or more hardware processors are configured by the instructions to: receive (i) a device category associated with a device fabrication, (ii) one or more device fabrication knowledge documents associated with the device category from a device fabrication knowledge repository, wherein each device fabrication knowledge document comprises a plurality of document paragraphs, wherein each document paragraph comprises one or more paragraph sentences, and each paragraph sentence comprises a plurality of paragraph sentence words; pre-process each device fabrication knowledge document of the one or more device fabrication knowledge documents, to obtain: (i) a plurality of pre-processed document paragraphs, in a plain text format, (ii) a section header for each pre-processed document paragraph of the plurality of pre-processed document paragraphs, wherein each pre-processed document paragraph comprises a plurality of pre-processed paragraph sentences, and wherein each pre-processed paragraph sentence comprises a plurality of pre-processed paragraph sentence words; identify one or more fabrication procedure paragraphs out of the plurality of pre-processed document paragraphs, by a trained fabrication procedure paragraph classification model, using the section header for each pre-processed document paragraph of the plurality of pre-processed document paragraphs, wherein each pre-processed document paragraph of the plurality of pre-processed document paragraphs is a fabrication procedure paragraph, if the pre-processed document paragraph comprises information related to a fabrication procedure; identify one or more entities, for each pre-processed paragraph sentence of the plurality of pre-processed paragraph sentences associated with each fabrication procedure paragraph of the one or more fabrication procedure paragraphs, by a trained named entity identification model, wherein the plurality of entities are associated with a plurality of predefined concepts related to the fabrication procedure; identify (i) one or more first predefined relations out of a first set of predefined relations, and (ii) one or more second predefined relations out of a second set of predefined relations, for each pre-processed paragraph sentence of the plurality of pre-processed paragraph sentences associated with each fabrication procedure paragraph of the one or more fabrication procedure paragraphs, by (i) a trained relation identification model, and (ii) a set of predefined pattern expressions, respectively, using the one or more entities identified for each pre-processed paragraph sentence; identify device fabrication procedure for each fabrication procedure paragraph of the one or more fabrication procedure paragraphs, by a rule based unsupervised algorithm, using the one or more entities identified for each pre-processed paragraph sentence of the plurality of pre-processed paragraph sentences associated with each fabrication procedure paragraph, wherein the device fabrication procedure for each fabrication procedure paragraph, comprises a sequence of operations; generate an operation sequence knowledge graph for each fabrication procedure paragraph of the one or more fabrication procedure paragraphs, using (i) the one or more entities identified for each pre-processed paragraph sentence of the plurality of pre-processed paragraph sentences associated with each fabrication procedure paragraph of the one or more fabrication procedure paragraphs, (ii) (a) the one or more first predefined relations out of the first set of predefined relations, and (b) the one or more second predefined relations out of the second set of predefined relations, identified for each pre-processed paragraph sentence of the plurality of pre-processed paragraph sentences associated with each fabrication procedure paragraph of the one or more fabrication procedure paragraphs, and (iii) the device fabrication procedure for each fabrication procedure paragraph of the one or more fabrication procedure paragraphs, using a graph database tool, and build the analytical platform to enable the device fabrication, using the operation sequence knowledge graph for each fabrication procedure paragraph of the one or more fabrication procedure paragraphs, in a graph search engine.

In yet another aspect, there is provided a computer program product comprising a non-transitory computer readable medium having a computer readable program embodied therein, wherein the computer readable program, when executed on a computing device, causes the computing device to: receive (i) a device category associated with a device fabrication, (ii) one or more device fabrication knowledge documents associated with the device category from a device fabrication knowledge repository, wherein each device fabrication knowledge document comprises a plurality of document paragraphs, wherein each document paragraph comprises one or more paragraph sentences, and each paragraph sentence comprises a plurality of paragraph sentence words; pre-process each device fabrication knowledge document of the one or more device fabrication knowledge documents, to obtain: (i) a plurality of pre-processed document paragraphs, in a plain text format, (ii) a section header for each pre-processed document paragraph of the plurality of pre-processed document paragraphs, wherein each pre-processed document paragraph comprises a plurality of pre-processed paragraph sentences, and wherein each pre-processed paragraph sentence comprises a plurality of pre-processed paragraph sentence words; identify one or more fabrication procedure paragraphs out of the plurality of pre-processed document paragraphs, by a trained fabrication procedure paragraph classification model, using the section header for each pre-processed document paragraph of the plurality of pre-processed document paragraphs, wherein each pre-processed document paragraph of the plurality of pre-processed document paragraphs is a fabrication procedure paragraph, if the pre-processed document paragraph comprises information related to a fabrication procedure; identify one or more entities, for each pre-processed paragraph sentence of the plurality of pre-processed paragraph sentences associated with each fabrication procedure paragraph of the one or more fabrication procedure paragraphs, by a trained named entity identification model, wherein the plurality of entities are associated with a plurality of predefined concepts related to the fabrication procedure; identify (i) one or more first predefined relations out of a first set of predefined relations, and (ii) one or more second predefined relations out of a second set of predefined relations, for each pre-processed paragraph sentence of the plurality of pre-processed paragraph sentences associated with each fabrication procedure paragraph of the one or more fabrication procedure paragraphs, by (i) a trained relation identification model, and (ii) a set of predefined pattern expressions, respectively, using the one or more entities identified for each pre-processed paragraph sentence; identify device fabrication procedure for each fabrication procedure paragraph of the one or more fabrication procedure paragraphs, by a rule based unsupervised algorithm, using the one or more entities identified for each pre-processed paragraph sentence of the plurality of pre-processed paragraph sentences associated with each fabrication procedure paragraph, wherein the device fabrication procedure for each fabrication procedure paragraph, comprises a sequence of operations; generate an operation sequence knowledge graph for each fabrication procedure paragraph of the one or more fabrication procedure paragraphs, using (i) the one or more entities identified for each pre-processed paragraph sentence of the plurality of pre-processed paragraph sentences associated with each fabrication procedure paragraph of the one or more fabrication procedure paragraphs, (ii) (a) the one or more first predefined relations out of the first set of predefined relations, and (b) the one or more second predefined relations out of the second set of predefined relations, identified for each pre-processed paragraph sentence of the plurality of pre-processed paragraph sentences associated with each fabrication procedure paragraph of the one or more fabrication procedure paragraphs, and (iii) the device fabrication procedure for each fabrication procedure paragraph of the one or more fabrication procedure paragraphs, using a graph database tool, and build the analytical platform to enable the device fabrication, using the operation sequence knowledge graph for each fabrication procedure paragraph of the one or more fabrication procedure paragraphs, in a graph search engine.

In an embodiment, the trained fabrication procedure paragraph classification model is obtained by: receiving (i) a plurality of training document paragraphs associated with the device category, in the plain text format, (ii) the section header for each training document paragraph of the plurality of training document paragraphs, and (iii) an annotation class for each training document paragraph of the plurality of training document paragraphs, wherein each training document paragraph comprises a plurality of training document paragraph sentences, and each training document paragraph sentence comprises a plurality of training document paragraph sentence words, and wherein the annotation class for each training document paragraph is one of: (a) the fabrication procedure paragraph, and (b) a non-fabrication procedure paragraph; obtaining: (a) a paragraph text vector, (b) a dictionary feature vector, and (c) a section header feature vector, for each training document paragraph of the plurality of training document paragraphs; and training a first bi-directional long short term memory (BiLSTM) network with: (i) (a) the paragraph text vector, (b) the dictionary feature vector, and (c) the section header feature vector, for each training document paragraph, at a time, of the plurality of training document paragraphs, and (ii) the annotation class for each training document paragraph of the plurality of training document paragraphs, to obtain the trained fabrication procedure paragraph classification model, wherein training the first BiLSTM network with each training document paragraph comprises: passing the paragraph text vector corresponding to the training document paragraph, as an input to a bi-directional long short term memory (BiLSTM) layer of the first BiLSTM network, to learn a hidden state of a first training document paragraph sentence word and the hidden state of a last training document paragraph sentence word, present in the training document paragraph; concatenating the dictionary feature vector and the section header feature vector, corresponding to the training document paragraph, with the hidden state of the first training document paragraph sentence word and the hidden state of the last training document paragraph sentence word, present in the training document paragraph, to obtain a concatenated feature vector of the training document paragraph; passing the concatenated feature vector of the training document paragraph to a soft-max layer of the first BiLSTM network to obtain a predicted probability value of the training document paragraph; minimizing a binary cross-entropy loss function of the first BiLSTM network, defined between the (i) the predicted probability value of the training document paragraph, and (ii) an actual probability value of the training document paragraph, wherein the actual probability value of the training document paragraph is defined from the annotation class corresponding to the training document paragraph; and optimizing weights of the first BiLSTM network, based on the binary cross-entropy loss function of the first BiLSTM network.

In an embodiment, the paragraph text vector for each training document paragraph comprises an embedding for each training document paragraph sentence word of the plurality of training document paragraph sentence words corresponding to each training document paragraph sentence of the plurality of training document paragraph sentences corresponding to the training document paragraph; the dictionary feature vector for each training document paragraph is obtained by: (i) defining an initial dictionary feature vector with a plurality of predefined keywords, and (ii) assigning a Boolean value for each predefined keyword of the plurality of predefined keywords defined in the initial dictionary feature vector, based on presence of the predefined keyword in the training document paragraph; and the section header feature vector for each training document paragraph of the plurality of training document paragraphs, is obtained by: (i) defining an initial section header feature vector with a plurality of predefined section headers, and (ii) assigning the Boolean value for each predefined section header of the plurality of predefined section headers defined in the initial section header feature vector, based on matching of the predefined section header with the section header of the training document paragraph.

In an embodiment, the one or more fabrication procedure paragraphs out of the plurality of pre-processed document paragraphs, are identified, by the trained fabrication procedure paragraph classification model, using the section header for each pre-processed document paragraph of the plurality of pre-processed document paragraphs, by: obtaining: (a) a paragraph text vector, (b) a dictionary feature vector, and (c) a section header feature vector, for each pre-processed document paragraph of the plurality of pre-processed document paragraphs; passing: (a) the paragraph text vector, (b) the dictionary feature vector, and (c) the section header feature vector, for each pre-processed document paragraph of the plurality of pre-processed document paragraphs, to the trained fabrication procedure paragraph classification model, to obtain a predicted probability value for each pre-processed document paragraph of the plurality of pre-processed document paragraphs; and identifying the one or more fabrication procedure paragraphs out of the plurality of pre-processed document paragraphs, based on the predicted probability value corresponding to each pre-processed document paragraph of the plurality of pre-processed document paragraphs.

In an embodiment, the paragraph text vector for each pre-processed document paragraph comprises an embedding for each pre-processed paragraph sentence word of the plurality of pre-processed paragraph sentence words corresponding to each pre-processed paragraph sentence of the plurality of pre-processed paragraph sentences corresponding to the pre-processed document paragraph; the dictionary feature vector for each pre-processed document paragraph is obtained by: (i) defining an initial dictionary feature vector with a plurality of predefined keywords, and (ii) assigning a Boolean value for each predefined keyword of the plurality of predefined keywords defined in the initial dictionary feature vector, based on presence of the predefined keyword in the pre-processed document paragraph; and the section header feature vector for each pre-processed document paragraph is obtained by: (i) defining an initial section header feature vector with a plurality of predefined section headers, and (ii) assigning the Boolean value for each predefined section header of the plurality of predefined section headers defined in the initial section header feature vector, based on matching of the predefined section header with the section header of the pre-processed document paragraph.

In an embodiment, the trained named entity identification model is obtained by: receiving (i) a plurality of training fabrication procedure paragraphs, wherein each training fabrication procedure paragraph comprises a plurality of training fabrication procedure paragraph sentences, and each training fabrication procedure paragraph sentence comprises a plurality of training fabrication procedure paragraph sentence words, (ii) an entity annotation for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs; obtaining: (a) a gazetteer feature vector, (b) a casing feature vector, (c) a part of speech (PoS) feature vector, (d) a character embedding vector, and (e) a word embedding, for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs; and training a second bi-directional long short term memory (BiLSTM) network with (i) (a) the gazetteer feature vector, (b) the casing feature vector, (c) the part of speech (PoS) feature vector, (d) the character embedding vector, and (e) the word embedding, for each training fabrication procedure paragraph sentence word of the plurality of training fabrication procedure paragraph sentence words present in each training fabrication procedure paragraph sentence, at a time, of each training fabrication procedure paragraph of the plurality of training fabrication procedure paragraphs, and (ii) the entity annotation for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs, to obtain the trained named entity identification model, wherein training the second BiLSTM network with each training fabrication procedure paragraph comprises: concatenating (a) the gazetteer feature vector, (b) the casing feature vector, (c) the part of speech (PoS) feature vector, (d) the character embedding vector, and (e) the word embedding, corresponding to each training fabrication procedure paragraph sentence word, to obtain a concatenated feature vector for each training fabrication procedure paragraph sentence word of the plurality of training fabrication procedure paragraph sentence words present in each training fabrication procedure paragraph sentence of the training fabrication procedure paragraph; passing the concatenated feature vector for each training fabrication procedure paragraph sentence word of the plurality of training fabrication procedure paragraph sentence words present in each training fabrication procedure paragraph sentence of the training fabrication procedure paragraph, to a bi-directional long short term memory (BiLSTM) layer of the second BiLSTM network, to learn a hidden state for each training fabrication procedure paragraph sentence word of the plurality of training fabrication procedure paragraph sentence words present in each training fabrication procedure paragraph sentence of the training fabrication procedure paragraph; passing the hidden state for each training fabrication procedure paragraph sentence word of the plurality of training fabrication procedure paragraph sentence words present in each training fabrication procedure paragraph sentence of the training fabrication procedure paragraph, to a conditional random field (CRF) layer of the second BiLSTM network, to obtain a predicted probability distribution, for each training fabrication procedure paragraph sentence of the training fabrication procedure paragraph; maximizing a probability function of the second BiLSTM network, defined based on (i) the predicted probability distribution, for each training fabrication procedure paragraph sentence of the training fabrication procedure paragraph, and (i) an actual probability distribution for each training fabrication procedure paragraph sentence of the training fabrication procedure paragraph, wherein the actual probability distribution for each training fabrication procedure paragraph sentence of the training fabrication procedure paragraph, is defined from the entity annotation for each training fabrication procedure paragraph sentence word of the plurality of training fabrication procedure paragraph sentence words present in each training fabrication procedure paragraph sentence of the training fabrication procedure paragraph; and optimizing weights of the second BiLSTM network, based on the probability function of the second BiLSTM network.

In an embodiment, the gazetteer feature vector for each training fabrication procedure paragraph sentence word, is obtained by: (i) defining an initial gazetteer feature vector with a plurality of predefined concepts, and (ii) assigning a Boolean value for each predefined concept of the plurality of predefined concepts defined in the initial gazetteer feature vector, based on association of the predefined concept with the training fabrication procedure paragraph sentence word; the casing feature vector for each training fabrication procedure paragraph sentence word is a predefined casing type of one or more predefined casing types, associated with the training fabrication procedure paragraph sentence word; the PoS feature vector for each training fabrication procedure paragraph sentence word is a predefined PoS type of one or more predefined PoS types, associated with the training fabrication procedure paragraph sentence word; the character embedding vector for each training fabrication procedure paragraph sentence word is an array of character embeddings associated with each character present in the training fabrication procedure paragraph sentence word; and the word embedding for each training fabrication procedure paragraph sentence word is an embedding of the training fabrication procedure paragraph sentence word.

In an embodiment, the one or more entities out of the plurality of entities, for each pre-processed paragraph sentence of the plurality of pre-processed paragraph sentences associated with each fabrication procedure paragraph of the one or more fabrication procedure paragraphs, are identified, using the trained named entity identification model, by: obtaining: (a) a gazetteer feature vector, (b) a casing feature vector, (c) a part of speech (PoS) feature vector, (d) a character embedding vector, and (e) a word embedding, for each pre-processed paragraph sentence word of the plurality of pre-processed paragraph sentence words present in each pre-processed paragraph sentence of the plurality of pre-processed paragraph sentences associated with each fabrication procedure paragraph of the one or more fabrication procedure paragraphs; concatenating (a) the gazetteer feature vector, (b) the casing feature vector, (c) the part of speech (PoS) feature vector, (d) the character embedding vector, and (e) the word embedding, corresponding to each pre-processed paragraph sentence word to obtain a concatenated feature vector for each pre-processed paragraph sentence word of the plurality of each pre-processed paragraph sentence words present in each pre-processed paragraph sentence of the plurality of pre-processed paragraph sentences associated with each fabrication procedure paragraph of the one or more fabrication procedure paragraphs; passing the concatenated feature vector for each pre-processed paragraph sentence word of the plurality of each pre-processed paragraph sentence words present in each pre-processed paragraph sentence of the plurality of pre-processed paragraph sentences associated with each fabrication procedure paragraph of the one or more fabrication procedure paragraphs, to the trained named entity identification model, to obtain a predicted probability distribution for each pre-processed paragraph sentence of the plurality of pre-processed paragraph sentences associated with each fabrication procedure paragraph; and identifying the one or more entities out of the plurality of entities, for each pre-processed paragraph sentence of the plurality of pre-processed paragraph sentences associated with each fabrication procedure paragraph of the one or more fabrication procedure paragraphs, based on the predicted probability distribution for each pre-processed paragraph sentence of the plurality of pre-processed paragraph sentences associated with each fabrication procedure paragraph.

In an embodiment, the gazetteer feature vector for each pre-processed paragraph sentence word, is obtained by: (i) defining an initial gazetteer feature vector with a plurality of predefined concepts, and (ii) assigning a Boolean value for each predefined concept of the plurality of predefined concepts defined in the initial gazetteer feature vector, based on association of the predefined concept with the pre-processed paragraph sentence word; the casing feature vector for each pre-processed paragraph sentence word is a predefined casing type of one or more predefined casing types, associated with the pre-processed paragraph sentence word; the PoS feature vector for each pre-processed paragraph sentence word is a predefined PoS type of one or more predefined PoS types, associated with the pre-processed paragraph sentence word; the character embedding vector for pre-processed paragraph sentence word is an array of character embeddings associated with each character present in the pre-processed paragraph sentence word; and the word embedding for each pre-processed paragraph sentence word is an embedding of the pre-processed paragraph sentence word.

In an embodiment, the trained relation identification model is obtained by: receiving (i) one or more entities identified for each training fabrication procedure paragraph sentence of a plurality of training fabrication procedure paragraph sentences associated with each training fabrication procedure paragraph of the plurality of training fabrication procedure paragraphs; (ii) a predefined relation annotation out of the first set of predefined relation annotations, for each predefined entity pair out of the one or more entities identified for each training fabrication procedure paragraph sentence of the plurality of training fabrication procedure paragraph sentences associated with each training fabrication procedure paragraph of the plurality of training fabrication procedure paragraphs; extracting (i) one or more entity-level feature vectors and (ii) one or more entity-pair-level feature vectors, for each training fabrication procedure paragraph sentence of the plurality of training fabrication procedure paragraph sentences associated with each training fabrication procedure paragraph, wherein (i) the one or more entity-level feature vectors for each training fabrication procedure paragraph sentence, comprises a first set of features associated with each predefined entity of the one or more entities identified for the training fabrication procedure paragraph sentence, and (ii) the one or more entity-pair-level feature vectors for each training fabrication procedure paragraph sentence, comprises a second set of features associated with each predefined entity pair out of the one or more entities identified for the training fabrication procedure paragraph sentence; and training a hybrid neural network with: (i) one or more entity-level feature vectors and (ii) one or more entity-pair-level feature vectors, for each training fabrication procedure paragraph sentence of the plurality of training fabrication procedure paragraph sentences associated with each training fabrication procedure paragraph, to obtain the trained relation identification model, wherein training the hybrid neural network for each training fabrication procedure paragraph sentence, comprises: passing, (i) the one or more entity-level feature vectors and (ii) the one or more entity-pair-level feature vectors, for the training fabrication procedure paragraph sentence, to the hybrid neural network, to obtain a predicted probability distribution for each predefined entity pair out of the one or more entities identified for the training fabrication procedure paragraph sentence; minimizing a categorical cross-entropy loss function of the hybrid neural network, defined between (i) the predicted probability distribution for each predefined entity pair out of the one or more entities identified for the training fabrication procedure paragraph sentence, and (ii) an actual probability distribution for each predefined entity pair out of the one or more entities identified for the training fabrication procedure paragraph sentence, wherein the actual probability distribution for each predefined entity pair is defined from the predefined relation annotation corresponding to the predefined entity pair; and optimizing weights of the hybrid neural network, based on the categorical cross-entropy loss function of the hybrid neural network.

In an embodiment, the one or more first predefined relations out of the first set of predefined relations, for each pre-processed paragraph sentence of the plurality of pre-processed paragraph sentences associated with each fabrication procedure paragraph of the one or more fabrication procedure paragraphs, are identified, by the trained relation identification model, using the one or more entities identified for each pre-processed paragraph sentence, by: extracting (i) one or more entity-level feature vectors and (ii) one or more entity-pair-level feature vectors, for each pre-processed paragraph sentence of the plurality of pre-processed paragraph sentences associated with each fabrication procedure paragraph of the one or more fabrication procedure paragraphs, wherein (i) the one or more entity-level feature vectors for each pre-processed paragraph sentence, comprises a first set of features associated with each predefined entity of the one or more entities identified for each pre-processed paragraph sentence, and (ii) the one or more entity-pair-level feature vectors for each pre-processed paragraph sentence, comprises a second set of features associated with each predefined entity pair out of the one or more entities identified for the pre-processed paragraph sentence; passing, (i) the one or more entity-level feature vectors and (ii) the one or more entity-pair-level feature vectors, for each pre-processed paragraph sentence of the plurality of pre-processed paragraph sentences associated with each training fabrication procedure paragraph, to the trained relation identification model, to obtain a predicted probability distribution for each predefined entity pair out of the one or more entities identified for each pre-processed paragraph sentence; and identifying the one or more first predefined relations out of the first set of predefined relations, for each pre-processed paragraph sentence of the plurality of pre-processed paragraph sentences associated with each fabrication procedure paragraph, based on the predicted probability distribution for each predefined entity pair out of the one or more entities identified for the pre-processed paragraph sentence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
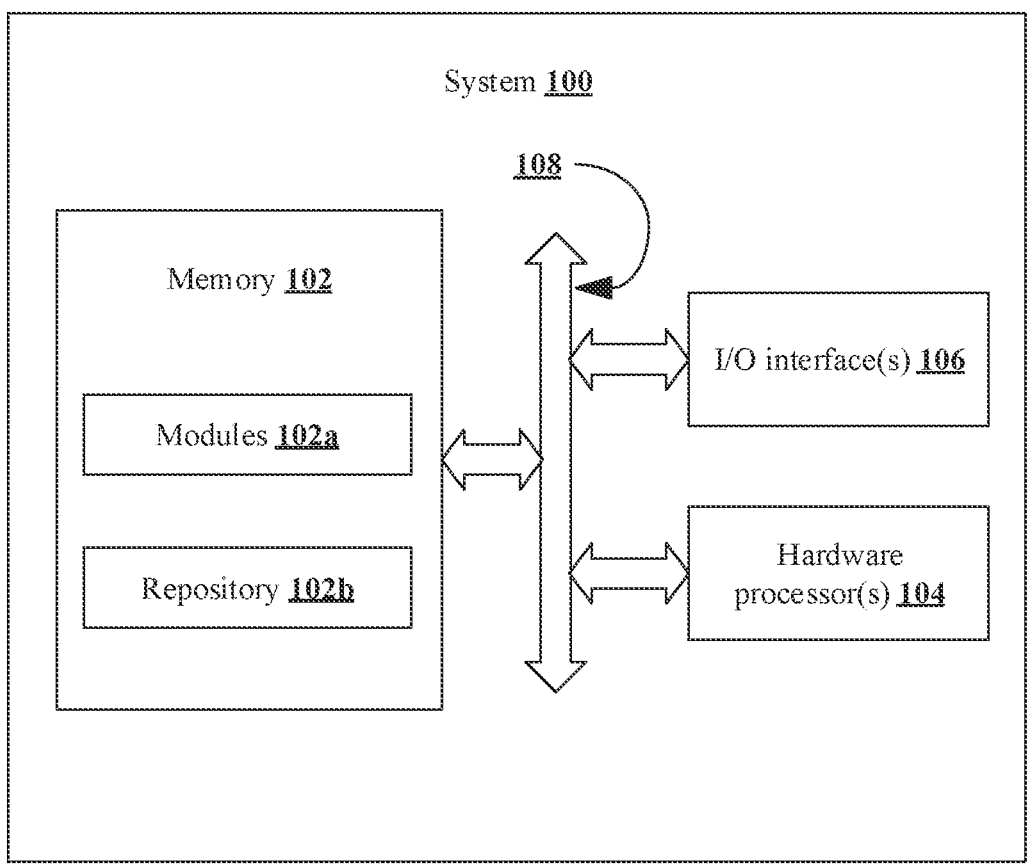
FIG. 1 is an exemplary block diagram of a system for building an analytical platform to enable a device fabrication, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Conventional approaches for screening and designing of the functional materials used for fabricating different type of devices ((herein after referred as a 'device fabrication') such as solar cells, lithium ion batteries and so on, may undergo a combination of tedious experimental and theoretical operations and characterization. In-silico techniques such as computational material science, and machine learning based property prediction models are being leveraged to design the functional materials. However, the in-silico techniques may require excessive experimental validation in order to design the functional materials with desired properties.

Moreover, material engineers and design engineers often need guidance on how other similar devices have been previously fabricated (defined as 'fabrication process), including, respective various operations such as cooling, heating, and so on, a sequence of operations, specific operating conditions, operating methods, and so on, while fabricating a new device. An abundant knowledge related to the fabrication process for each device is existing in an unstructured format, in the form of literature including publications, reports, documents, experimental thesis, and so on. Hence, the material engineers and the design engineers may need to spend more time and efforts in order to find relevant knowledge out of the existing knowledge for fabricating the new devices.

The present disclosure herein provides methods and systems that solves the technical problem of finding the relevant knowledge out of the existing knowledge, in a structured form, for fabricating different devices, by building an analytical platform. The analytical platform is a knowledge analytical engine that is built for each device such as solar cells, lithium ion batteries, and so on, using the existing knowledge of the fabrication process. The unstructured format of the existing knowledge of the fabrication process is transformed into a structured format using a set of artificial intelligence (AI) and machine learning models, and a knowledge representation model of the fabrication process. The structured format of the existing knowledge is hierarchically arranged in the analytical platform. In an embodiment, the analytical platform includes but are not limited to a graph search platform, a knowledge query engine, a question-answer (QA) platform, a virtual chatbot, and so on.

Referring now to the drawings, and more particularly to FIG. 1 through FIG. 11, where similar reference characters denote corresponding features consistently throughout the figures, there are shown preferred embodiments and these embodiments are described in the context of the following exemplary systems and/or methods.

FIG. 1 is an exemplary block diagram of a system 100 for building the analytical platform to enable the device fabrication, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
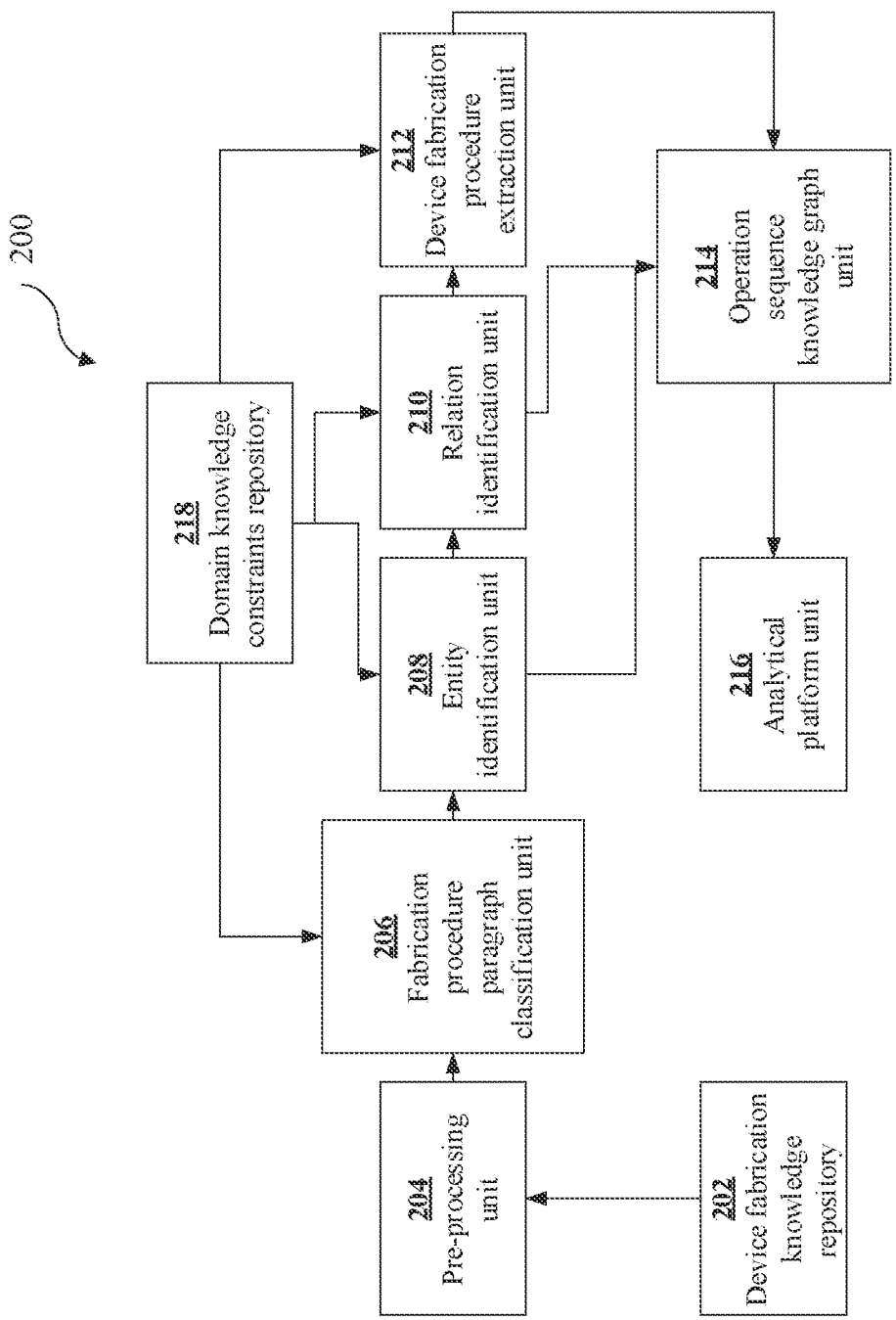
FIG. 2 is an exemplary block diagram illustrating modules of the system of FIG. 1 for building the analytical platform to enable the device fabrication, in accordance with some embodiments of the present disclosure.
Figure 3A:
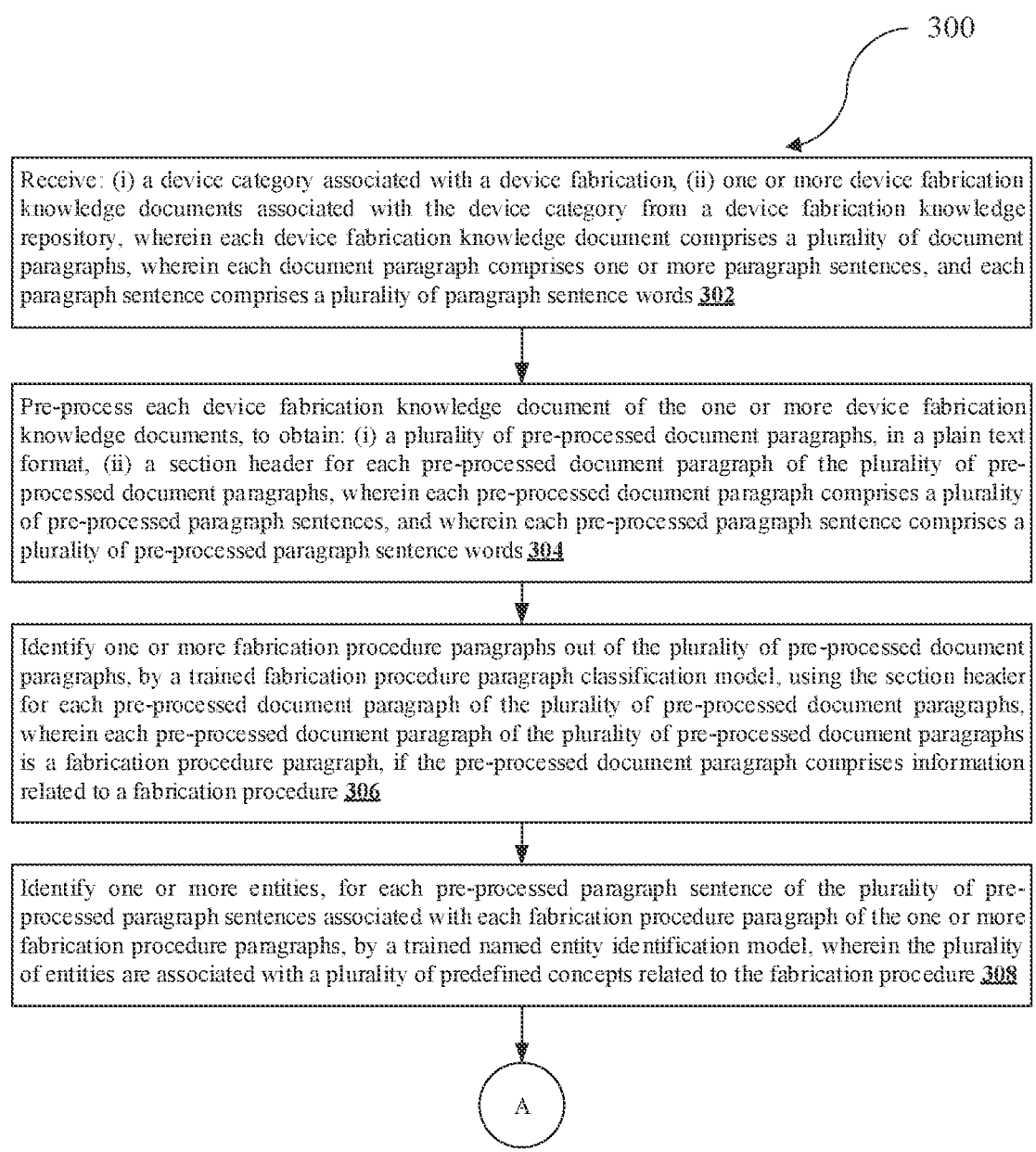
FIG. 3A through FIG. 3B illustrate an exemplary flow diagrams of a processor-implemented method for building the analytical platform to enable the device fabrication, in accordance with some embodiments of the present disclosure.
Figure 3B:
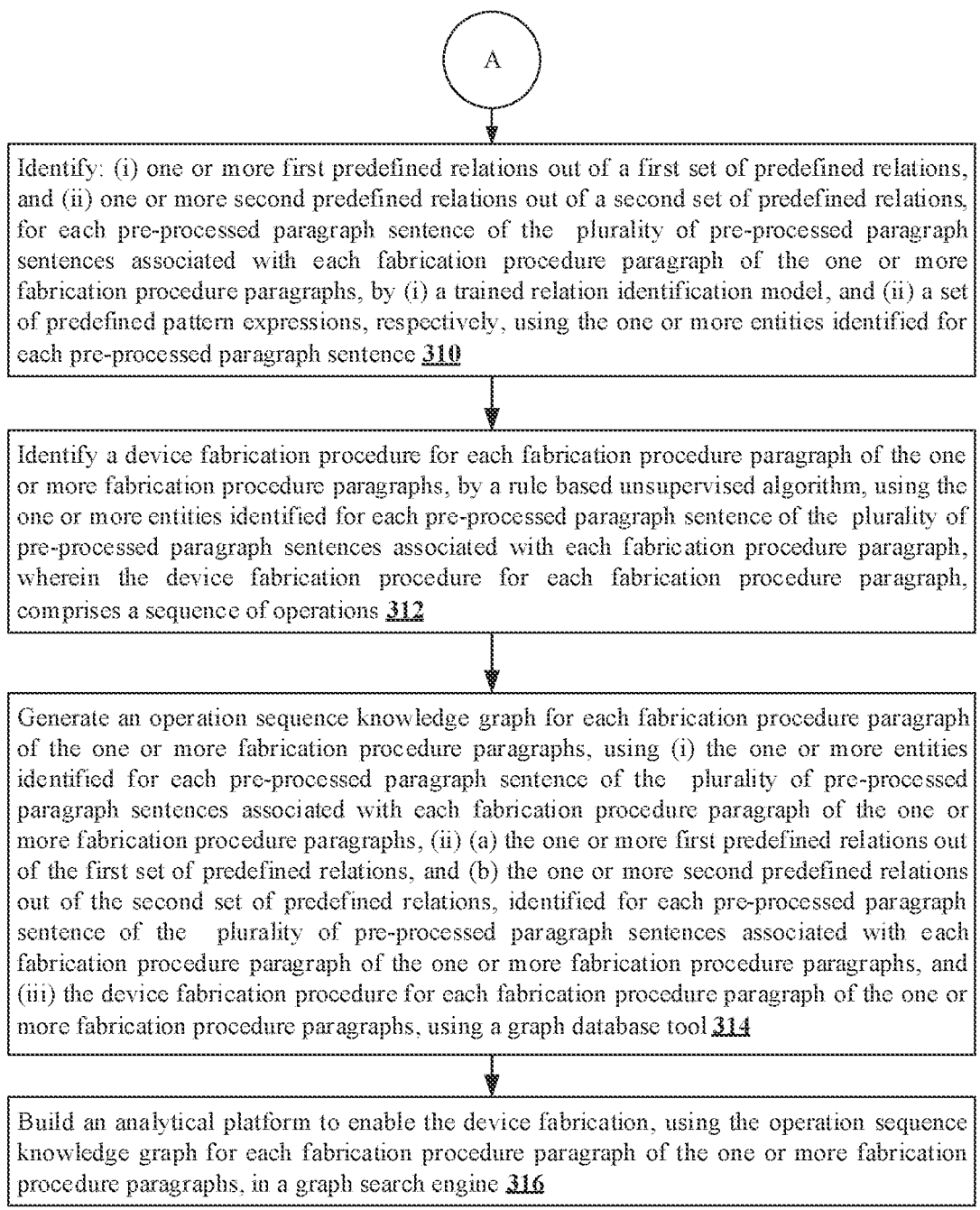

Referring collectively to FIG. 2 and FIG. 3A through FIG. 3B, components and functionalities of the system 100 are described in accordance with an example embodiment of the present disclosure. For example, FIG. 2 is an exemplary block diagram illustrating modules 200 of the system 100 of FIG. 1 for building the analytical platform to enable the device fabrication, in accordance with some embodiments of the present disclosure. The modules 200 of FIG. 2 are the one or more hardware processors 104 of FIG. 1, however named as functional modules for ease of explanation. As shown in FIG. 2, the modules 200 include a device fabrication knowledge repository 202, a pre-processing unit 204, a fabrication procedure paragraph classification unit 206, an entity identification unit 208, a relation identification unit 210, a device fabrication procedure extraction unit 212, an operation sequence knowledge graph unit 214, an analytical platform unit 216, and a domain knowledge constraints repository 218. In an embodiment, the modules of FIG. 2 except the device fabrication knowledge repository 202 and the domain knowledge constraints repository 218, may be stored in the plurality of modules 102a comprised in the memory 102 of the system 100. In an embodiment, the device fabrication knowledge repository 202 and the domain knowledge constraints repository 218 of FIG. 2 may be stored in the repository 102b comprised in the memory 102 of the system 100.

FIG. 3A through FIG. 3B illustrate an exemplary flow diagrams of the processor-implemented method 300 for building the analytical platform to enable the device fabrication, in accordance with some embodiments of the present disclosure. Although steps of the method 300 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously.

At step 302 of the method 300, the one or more hardware processors 104 of the system 100 are configured to receive: (i) a device category associated with a device fabrication, (ii) one or more device fabrication knowledge documents associated with the device category. The device category defines a type of the device such as solar cells, lithium ion batteries, and so on. In an embodiment, the one or more device fabrication knowledge documents associated with the received device category are obtained from the device fabrication knowledge repository 202.

In an embodiment, device fabrication knowledge repository 202 may include a plurality of device fabrication knowledge documents (for example, 1000 documents) describing the existing domain knowledge related to the fabrication process, for each device category. The one or more device fabrication knowledge documents may be randomly obtained from the plurality of device fabrication knowledge documents. Each device fabrication knowledge document includes a plurality of document paragraphs in the form of lines. Each document paragraph includes one or more paragraph sentences, and further each paragraph sentence includes a plurality of paragraph sentence words. Each paragraph sentence word includes one or more characters.

In an embodiment, the plurality of device fabrication knowledge documents for each device category may be obtained automatically from world wide web (WWW) by configuring the system 100 with a set of search strings and keywords. In another embodiment, the plurality of device fabrication knowledge documents for each device category may be obtained manually from various resources such as literature. The plurality of device fabrication knowledge documents for each device category may be in various unstructured forms including presentations, papers, journals, project documents, conference documents, patents, and so on. Further, the plurality of device fabrication knowledge documents for each device category may be present in various unstructured formats including, text documents, PDF, HTML, drawings, and so on.

At step 304 of the method 300, the one or more hardware processors 104 of the system 100 are configured to pre-process each device fabrication knowledge document of the one or more device fabrication knowledge documents received at step 302 of the method, to obtain a plurality of pre-processed document paragraphs, in a plain text format, through the pre-processing unit 204. The pre-processing unit 204 includes a set of pre-processing tools including format conversion tools such as Cermine tool, image to text conversion tools, and so on. Each device fabrication knowledge document is processed using one or more pre-processing tools out of the set of pre-processing tools.

In an embodiment, the pre-processing of each device fabrication knowledge document includes at least one of: (i) converting the document format to a text format, (ii) removing additional information such as title, abstract, section header and so on, (iii) removing a document paragraph that contains less than or equal to a predefined number of lines, (iv) removing the document paragraph that contains less than or equal to a predefined number of words per paragraph, (v) removing special characters such as asterisk (*), and (&), and so on, and (vi) removing page numbers, line numbers, references, and hyperlinks. In an embodiment, the predefined number of lines is '3' and the predefined number of words is '2'.

Further, the pre-processing of each device fabrication knowledge document includes obtaining the section header for each document paragraph present in the device fabrication knowledge document. In an embodiment, a predefined regular expression may be applied on each device fabrication knowledge document to obtain the section header for each document paragraph. In an embodiment, the predefined regular expression may be: '(`^(\d.)?([A-Z](\S+\s*){1,3})[.:\n]`)'.

Hence, after the pre-processing step, the plurality of pre-processed document paragraphs, in the plain text format, and the section header for each pre-processed document paragraph are obtained from the one or more device fabrication knowledge documents. Each pre-processed document paragraph includes a plurality of pre-processed paragraph sentences. Each pre-processed paragraph sentence includes a plurality of pre-processed paragraph sentence words, where each pre-processed paragraph sentence word includes one or more characters.

At step 306 of the method 300, the one or more hardware processors 104 of the system 100 are configured to identify one or more fabrication procedure paragraphs out of the plurality of pre-processed document paragraphs obtained at step 304 of the method 300, through the fabrication procedure paragraph classification unit 206. The fabrication procedure paragraph classification unit 206 includes a trained fabrication procedure paragraph classification model that is used to identify the one or more fabrication procedure paragraphs, using the section header obtained at step 304 of the method 300, for each pre-processed document paragraph of the plurality of pre-processed document paragraphs. Each pre-processed document paragraph of the plurality of pre-processed document paragraphs is a fabrication procedure paragraph, if the pre-processed document paragraph includes information related to the fabrication procedure. More specifically, each fabrication procedure paragraph includes at least some information related to the fabrication process such as operations, the sequence of operations, the specific operating conditions, the operating methods, and so on. The pre-processed document paragraphs that do not contain the information related to the fabrication procedure are ignored.

In an embodiment, obtaining the trained fabrication procedure paragraph classification model is described in the following steps. Firstly, (i) a plurality of training document paragraphs associated with the device category received at step 302 of the method 300, in the plain text format, (ii) the section header for each training document paragraph of the plurality of training document paragraphs, and (iii) an annotation class for each training document paragraph of the plurality of training document paragraphs, are received. In an embodiment, the plurality of training document paragraphs and the section header for each training document paragraph may be obtained after applying the pre-processing step as described at step 304 of the 300, on a set of device fabrication knowledge documents. In an embodiment, the set of device fabrication knowledge documents may be randomly selected from the device fabrication knowledge repository 202. In an embodiment, the device fabrication knowledge documents (i) present in the set of device fabrication knowledge documents and (ii) present in the one or more device fabrication knowledge documents received at step 302 of the method 300, may be different.

Each training document paragraph includes a plurality of training document paragraph sentences. Each training document paragraph sentence includes a plurality of training document paragraph sentence words. The annotation class for each training document paragraph is one of: (a) the fabrication procedure paragraph, and (b) a non-fabrication procedure paragraph. The fabrication procedure paragraph contains at least some information related to the fabrication process, whereas the non-fabrication procedure paragraph does not contain any information related to the fabrication procedure. Hence some of the training document paragraphs (positive samples) out of the plurality of training document paragraphs are fabrication procedure paragraphs, while the other training document paragraphs (negative samples) are non-fabrication procedure paragraphs. Mathematically, the annotation class is a Boolean class whose value is '1', if the training document paragraph is the fabrication procedure paragraph, and the value is '0', if the training document paragraph is the non-fabrication procedure paragraph.

Next, (a) a paragraph text vector, (b) a dictionary feature vector, and (c) a section header feature vector, for each training document paragraph of the plurality of training document paragraphs, are obtained. In an embodiment, the paragraph text vector for each training document paragraph includes an embedding for each training document paragraph sentence word of the plurality of training document paragraph sentence words corresponding to each training document paragraph sentence of the plurality of training document paragraph sentences corresponding to the training document paragraph. In an embodiment, a fastText based embedding layer is used to obtain the embedding for each training document paragraph sentence word.

In an embodiment, the dictionary feature vector for each training document paragraph is obtained by defining an initial dictionary feature vector of vector size m with a plurality of predefined keywords. The vector size m equals to a number of the plurality predefined keywords that are present in a keyword dictionary. In an embodiment, The keyword dictionary includes the plurality of predefined keywords related to the fabrication procedure of the device category, such as operation names, parameter names, units, operating device names, frequently used chemical names, and synonyms thereof. Then, a Boolean value for each predefined keyword of the plurality of predefined keywords defined in the initial dictionary feature vector, is assigned based on presence of the predefined keyword in the training document paragraph. For example, if the predefined keyword is present in the training document paragraph (matches with one of the training document paragraph sentence word present in the training document paragraph), then the Boolean value '1' is assigned for the predefined keyword. If the predefined keyword is not present in the training document paragraph (not matches with any one of the training document paragraph sentence word present in the training document paragraph), then the Boolean value '0' is assigned for the predefined keyword.

In an embodiment, the section header feature vector for each training document paragraph is obtained by defining an initial section header feature vector of vector size n with a plurality of predefined section headers. The vector size n equals to a number of the plurality of predefined section headers that are present in a section headers dictionary. In an embodiment, the section headers dictionary includes possible combinations of the section headers identified in the literature. In an embodiment, the section headers may be obtained by applying the regular expression described at step 304 of the method 300, on the plurality of device fabrication knowledge documents present in the device fabrication knowledge repository 202. Then, the Boolean value for each predefined section header of the plurality of predefined section headers defined in the initial section header feature vector, is assigned based on matching of the predefined section header with the section header of the training document paragraph. For example, if the predefined section header matches with the section header of the training document paragraph, then the Boolean value '1' is assigned to the predefined section header. If the predefined section header is not matching with the section header of the training document paragraph, then the Boolean value '0' is assigned to the predefined section header. In an embodiment, the keyword dictionary and the section headers dictionary may be present in the domain knowledge constraints repository 218.

Figure 4:
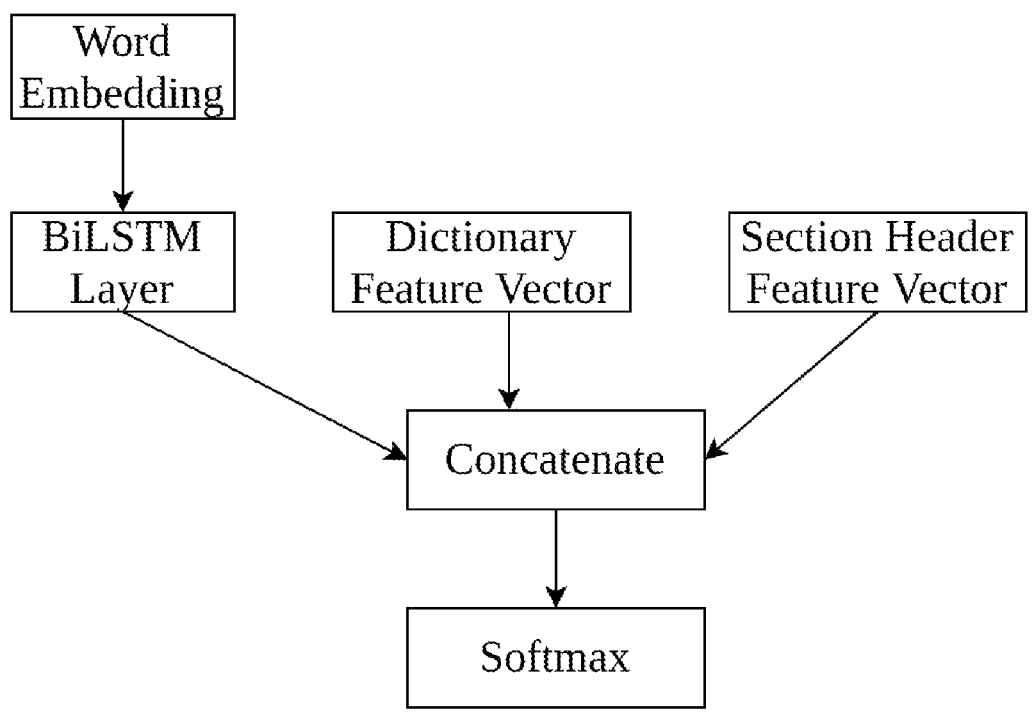
FIG. 4 is a block diagram of a first bi-directional long short term memory (BiLSTM) network, to obtain a trained fabrication procedure paragraph classification model, in accordance with some embodiments of the present disclosure.

Then, the trained fabrication procedure paragraph classification model is obtained by training a first bi-directional long short term memory (BiLSTM) network with: (i) (a) the paragraph text vector, (b) the dictionary feature vector, and (c) the section header feature vector, for each training document paragraph, at a time, of the plurality of training document paragraphs, using (ii) the annotation class for each training document paragraph of the plurality of training document paragraphs. FIG. 4 is a block diagram of the first bi-directional long short term memory (BiLSTM) network, to obtain the trained fabrication procedure paragraph classification model, in accordance with some embodiments of the present disclosure.

Training the first bi-directional long short term memory (BiLSTM) network with: (i) (a) the paragraph text vector, (b) the dictionary feature vector, and (c) the section header feature vector, for each training document paragraph, is explained below. Firstly, the paragraph text vector corresponding to the training document paragraph, is passed as an input to a bi-directional long short term memory (BiLSTM) layer of the first BiLSTM network. The bi-directional long short term memory (BiLSTM) layer of the first BiLSTM network, learns a hidden state of a first training document paragraph sentence word and the hidden state of a last training document paragraph sentence word, present in the training document paragraph. Both the dictionary feature vector and the section header feature vector, corresponding to the training document paragraph, are concatenated with the hidden state of the first training document paragraph sentence word and the hidden state of the last training document paragraph sentence word, to obtain a concatenated feature vector for the training document paragraph.

The concatenated feature vector of the training document paragraph is then passed to a soft-max layer of the first BiLSTM network to obtain a predicted probability value of the training document paragraph. A binary cross-entropy loss function of the first BiLSTM network, defined between (i) the predicted probability value of the training document paragraph, and (ii) an actual probability value of the training document paragraph, is minimized. The actual probability value of the training document paragraph is defined from the annotation class corresponding to the training document paragraph. For example, the actual probability value of the training document paragraph is '1' if the annotation class corresponding to the training document paragraph is the fabrication procedure paragraph (positive sample). Similarly, the actual probability value of the training document paragraph is '0' if the annotation class corresponding to the training document paragraph is the non-fabrication procedure paragraph (negative sample). In an embodiment, the binary cross-entropy loss function of the first BiLSTM network is mathematically expressed as:

$$\text{Loss function} = -[m_1 t \log(p) + m_2(1-t)\log(1-p)] \quad (1)$$

where p represents the predicted probability value of the training document paragraph, t represents the actual probability value of the training document paragraph, and $m_1$ and $m_2$ represents weights corresponding to misclassification cost of the annotation class 1 (fabrication procedure paragraph (positive sample)) and the annotation class 0 (non-fabrication procedure paragraph (negative sample)), respectively.

Based on the binary cross-entropy loss function of the first BiLSTM network, weights of the first BiLSTM network are optimized. Likewise, the first BiLSTM network is trained for the plurality of training document paragraphs to obtain the trained fabrication procedure paragraph classification model. Further, the trained fabrication procedure paragraph classification model may be validated to finetune the weights of the first BiLSTM network.

The trained fabrication procedure paragraph classification model is then used to identify the one or more fabrication procedure paragraphs out of the plurality of pre-processed document paragraphs, using the section header for each pre-processed document paragraph of the plurality of pre-processed document paragraphs. Firstly, (a) the paragraph text vector, (b) the dictionary feature vector, and (c) the section header feature vector, for each pre-processed document paragraph, are obtained in the similar manner described during the training of the first BiLSTM network. The paragraph text vector for each pre-processed document paragraph includes an embedding for each pre-processed paragraph sentence word of the plurality of pre-processed paragraph sentence words corresponding to each pre-processed paragraph sentence of the plurality of pre-processed paragraph sentences corresponding to the pre-processed document paragraph. In an embodiment, the fastText based embedding layer is used to obtain the embedding for each pre-processed paragraph sentence word.

The dictionary feature vector for each pre-processed document paragraph is obtained by defining the initial dictionary feature vector with the plurality of predefined keywords. Then, the Boolean value for each predefined keyword is assigned based on presence of the predefined keyword in the pre-processed document paragraph. For example, if the predefined keyword is present in the pre-processed document paragraph (matches with one of the pre-processed paragraph sentence word present in the pre-processed document paragraph), then the Boolean value '1' is assigned for the predefined keyword. If the predefined keyword is not present in the pre-processed document paragraph (not matches with any one of pre-processed paragraph sentence word present in the pre-processed document paragraph), then the Boolean value '0' is assigned for the predefined keyword.

The section header feature vector for each pre-processed document paragraph is obtained by defining the initial section header feature vector with the plurality of predefined section headers. Then, the Boolean value for each predefined section header is assigned, based on matching of the predefined section header with the section header of the pre-processed document paragraph. For example, if the predefined section header matches with the section header of the pre-processed document paragraph, then the Boolean value '1' is assigned to the predefined section header. If the predefined section header is not matching with the section header of the pre-processed document paragraph, then the Boolean value '0' is assigned to the predefined section header.

Then, (a) the paragraph text vector, (b) the dictionary feature vector, and (c) the section header feature vector, for each pre-processed document paragraph of the plurality of pre-processed document paragraphs, is passed to the trained fabrication procedure paragraph classification model, to obtain the predicted probability value for each pre-processed document paragraph. Lastly, the one or more fabrication procedure paragraphs are identified from the plurality of pre-processed document paragraphs, based on the predicted probability value corresponding to each pre-processed document paragraph. In an embodiment, if the predicted probability value of the pre-processed document paragraph is greater than or equal to '0.5', then the pre-processed document paragraph is identified as the fabrication procedure paragraph. Similarly, if the predicted probability value of the pre-processed document paragraph is less than '0.5', then the pre-processed document paragraph is identified as the non-fabrication procedure paragraph and such pre-processed document paragraph are not considered for further processing.

An exemplary fabrication procedure paragraph after the pre-processing is mentioned below. The exemplary fabrication procedure paragraph includes six fabrication procedure paragraph sentences. The information related to the fabrication process may present in at least one fabrication procedure paragraph sentence.

An exemplary fabrication procedure paragraph: "Solar cells were fabricated on pre-cleaned ITO-coated glass substrates. First, a thin (about 5 nm) PT layer was deposited on ITO-coated glass by electrochemical polymerization. Then the PT film was infiltrated with $PbI2$ by spin-coating at 8,000 rpm for 60 s with a $PbI2$ solution in dimethylformamide (DMF) (462 mg·mL−1, at 20° C.) in a N2 glove box. After drying, the film was dipped in a $CH3NH3I$ solution in 2-propanol (10 mg·mL−1) at 70° C. for 90 s in air, then rinsed with 2-propanol. After the $CH3NH3I$ perovskite was annealed at 100° C. for 40 min in air, C60 (30-50 nm)/BCP (5-15 nm) were deposited sequentially under high vacuum. Finally, Ag (100 nm) was thermally evaporated on top of the device to form the cell's back contact."

An exemplary non-fabrication procedure paragraph after the pre-processing is mentioned below. The exemplary non-fabrication procedure paragraph describes about materials but does not include any information related to the fabrication process.

An exemplary non-fabrication procedure paragraph: "Thiophene and BF3·Et2O (BFEE) were purchased from J and K. $PbI2$, C60, BCP, and Ag were purchased from Alfa Aesar and Sigma-Aldrich. Indium tin oxide (ITO)-coated glass substrates with sheet resistance of 24 Ω/sq were purchased from CSG Holding Co., Ltd. BF3·Et2O was purified by distillation prior to its use. Cyclic voltammograms were obtained in dichloromethane (1×10-3 M) using tetrabutylammonium hexafluorophosphate (TBAPF6) (0.1 M) as the supporting electrolyte at a scan rate of 0.1 V·s−1 and Fc/Fc+(Fc=ferrocene) as an internal reference during the measurement. The HOMO and LUMO energy levels were estimated relative to the energy level of a ferrocene reference (4.8 eV below vacuum level). UV-Vis spectra were obtained with a JASCO V-570 spectrophotometer."

At step 308 of the method 300, the one or more hardware processors 104 of the system 100 are configured to identify one or more entities, for each pre-processed paragraph sentence of the plurality of pre-processed paragraph sentences associated with each fabrication procedure paragraph of the one or more fabrication procedure paragraphs obtained at step 306 of the method 300, through the entity identification unit 208. The plurality of entities is associated with a plurality of predefined concepts related to the fabrication procedure of the device category. In an embodiment, the plurality of predefined concepts related to the fabrication procedure, may be captured from a knowledge representation meta model.

The knowledge representation meta model may be defined from an ontology generated from the existing domain knowledge of the fabrication process. The ontology provides a path to obtain the knowledge representation meta model by modelling the domain knowledge in terms of concepts of the domain and the relationships between these concepts. The modelling may guide on how the domain knowledge to be captured and reasoned with to enable decisions pertaining to various processes during the device fabrication. The modelling enables capturing the domain knowledge about the functional materials, their structures and properties, synthesis operations, respective operating parameters and operating methods, apparatus being used in each operation, and the properties and performance characteristics of the device that result from performing these operations. The modelling also enables reasoning with the domain knowledge to be able to answer questions that help the engineers make informed decisions during the device fabrication. Typical reasoning includes what operations should be performed to achieve desired performance characteristics, in which sequence they should be performed, what type and amount of materials should be used in a particular operation, the operating conditions to be used, the operating method to be used, and so on.

Figure 5:
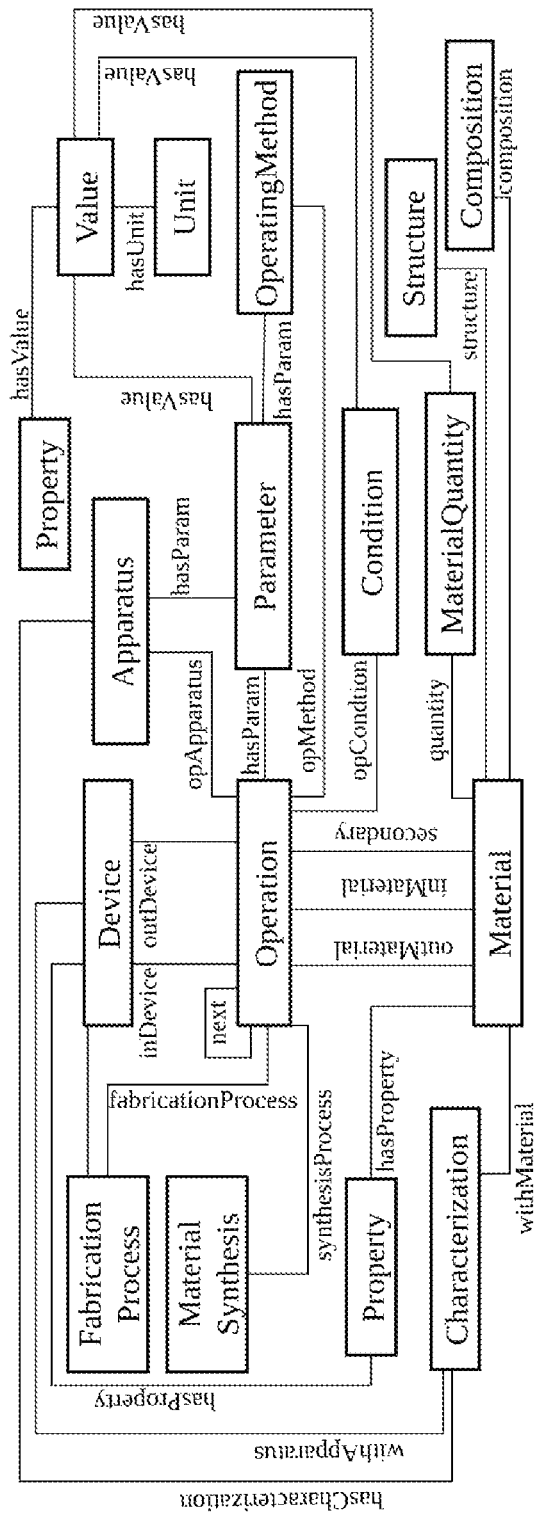
FIG. 5 is a block diagram illustrating an exemplary knowledge representation meta model for building the analytical platform to enable the device fabrication, in accordance with some embodiments of the present disclosure.

FIG. 5 is a block diagram illustrating an exemplary knowledge representation meta model for building the analytical platform to enable the device fabrication, in accordance with some embodiments of the present disclosure. As shown in FIG. 5, the entities are represented in terms of the plurality of predefined concepts related to the fabrication procedure. An association between two entities form a relation and a plurality of predefined relations are also shown in FIG. 5. From FIG. 5, the plurality of predefined concepts include: Fabrication process, Material synthesis, Property, Characterization, Device (fabrication device), Operation, Material, Apparatus (operating device), Parameter, Condition, Material quantity, Value, Unit (measurement type), Operating method, Structure, and Composition.

The predefined concept Device models the devices that are being fabricated or developed. A device has the fabrication process in the form of the sequence of operations. The predefined concept Operation models an atomic process performed on a material and/or device with a set of parameters (the predefined concept Parameter). A parameter is a measurable factor that represents a condition (the predefined concept Condition) for the operation. An operation may use one or more materials (the predefined concept Material) and a specific apparatus (the predefined concept Apparatus) to achieve the desired state of the device and/or material. The predefined concept Apparatus models a technical equipment needed to perform a particular operation. An operation may use a specific method to carry out the operation.

Similarly, the predefined concept Material models the materials used in the operation (predefined concept Operation). A material may be a chemical compound, a chemical element, a solution or a mixture. Different materials may play different roles depending on how they are used in an operation. A material that is transformed chemically during the operation is referred as a precursor material. Whereas, a material that is necessary to carry out the operation in an efficient manner but not transformed chemically is referred as a secondary material (e.g., materials such as catalyst, promoter, or even a gas in the environment).

Further, the association between a pair of the predefined concepts forms one or more relations and such one or more relations for each concepts forms a plurality of relations. From FIG. 5, the plurality of predefined relations includes: inMaterial, outMaterial, inDevice, outDevice, hasParam, opApparatus, has Value, hasUnit, hasProperty, opMethod, and opCondition. The predefined relation MaterialQuantity specifies an amount of material consumed in a particular operation, and represented in terms of weight, volume, etc. The predefined relation MaterialComposition describes the chemical composition of the material being used in the operation. The predefined relation Property describes the properties of the material being used in the operation. The predefined relation Characterization describes the performance of the device, which is a measure of the property the device exhibits when subjected to specified conditions.

In an embodiment, the entity identification unit 208 includes a trained named entity identification model that is used to identify the one or more entities, for each preprocessed paragraph sentence of the plurality of pre-processed paragraph sentences associated with each fabrication procedure paragraph. In an embodiment, obtaining the trained named entity identification model is described in the following steps. Firstly, a plurality of training fabrication procedure paragraphs is received. Each training fabrication procedure paragraph includes a plurality of training fabrication procedure paragraph sentences. Each training fabrication procedure paragraph sentence includes a plurality of training fabrication procedure paragraph sentence words.

In an embodiment, the plurality of training fabrication procedure paragraphs may be obtained from the plurality of training document paragraphs mentioned at step 306 of the method 300, using the trained fabrication procedure paragraph classification model. Further, an entity annotation for each training fabrication procedure paragraph sentence word of the plurality of training fabrication procedure paragraph sentence words present in each training fabrication procedure paragraph sentence of each training fabrication procedure paragraph is received. The entity annotation for each training fabrication procedure paragraph sentence word indicates the predefined concept out of the plurality of predefined concepts captured from the knowledge representation meta model.

Next, (a) a gazetteer feature vector, (b) a casing feature vector, (c) a part of speech (PoS) feature vector, (d) a character embedding vector, and (e) a word embedding, for each training fabrication procedure paragraph sentence word of the plurality of training fabrication procedure paragraph sentence words present in each training fabrication procedure paragraph sentence of each training fabrication procedure paragraph are obtained.

The gazetteer feature vector for each training fabrication procedure paragraph sentence word, is obtained by defining an initial gazetteer feature vector of the vector size k with the plurality of predefined concepts. The vector size k refers to a number of the plurality of predefined concepts captured from the knowledge representation meta model. Next, the Boolean value for each predefined concept defined in the initial gazetteer feature vector, is assigned, based on association of the predefined concept with the training fabrication procedure paragraph sentence word. For example, if the predefined concept has the association with the training fabrication procedure paragraph sentence word, then the Boolean value '1' is assigned for the predefined concept. If the predefined concept has no association with the training fabrication procedure paragraph sentence word, then the Boolean value '0' is assigned for the predefined concept. More specifically, if the training fabrication procedure paragraph sentence word is 'annealing', then the predefined concept Operation has the association with the 'annealing'. Hence, the Boolean value '1' is assigned to the predefined concept Operation in the initial gazetteer feature vector. Similarly, the predefined concept Apparatus has no association with the 'annealing'. Hence, the Boolean value '0' is assigned to the predefined concept Apparatus in the initial gazetteer feature vector.

The casing feature vector for each training fabrication procedure paragraph sentence word is a predefined casing type of one or more predefined casing types, associated with the training fabrication procedure paragraph sentence word. In an embodiment, the one or more predefined casing types include: {'numeric', 'allLower', 'allUpper', 'initialUpper', 'other', 'mainly_numeric', 'contains_digit', 'PADDING_WORD'}. A predefined casing value is assigned to each predefined casing type of the training fabrication procedure paragraph sentence word. Table 1 shows the predefined casing value for each predefined casing type of the training fabrication procedure paragraph sentence word.

TABLE 1

| Predefined casing value | Predefined casing type |
|---|---|
| 0 | If the training fabrication procedure paragraph sentence word is a number ("4000", "25", etc.) |
| 1 | If all characters of the training fabrication procedure paragraph sentence word are lowercase ("glass", "at", "seconds", etc.) |
| 2 | If all characters of the training fabrication procedure paragraph sentence word are capitalized. For example, abbreviations of chemical names are described (ex - "FTO", "ITO", etc) |
| 3 | If the initial character of the training fabrication procedure paragraph sentence word is uppercase (for example, "Aldrich") |
| 4 | If none of the conditions match |
| 5 | If more than 50% of the characters in the training fabrication procedure paragraph sentence word are numeric (digits) |
| 6 | If digits present within the training fabrication procedure paragraph sentence word, For example, "$PbCl_2$", "$MAPbI_3$", etc. |
| 7 | If the training fabrication procedure paragraph sentence word is a padding word |

The PoS feature vector for each training fabrication procedure paragraph sentence word is a predefined PoS type of one or more predefined PoS types, associated with the training fabrication procedure paragraph sentence word. In an embodiment, the one or more predefined PoS types include 45 part of speech tags present in a chemical aware PoS tagger.

The character embedding vector for each training fabrication procedure paragraph sentence word is an array of character embeddings associated with each character present in the training fabrication procedure paragraph sentence word. In an embodiment, an embedding layer may be used to learn the character embedding for each character.

The word embedding for each training fabrication procedure paragraph sentence word is an embedding of the training fabrication procedure paragraph sentence word. In an embodiment, an ELMo embedding is used to obtain the word embedding for each training fabrication procedure paragraph sentence word.

Figure 6:
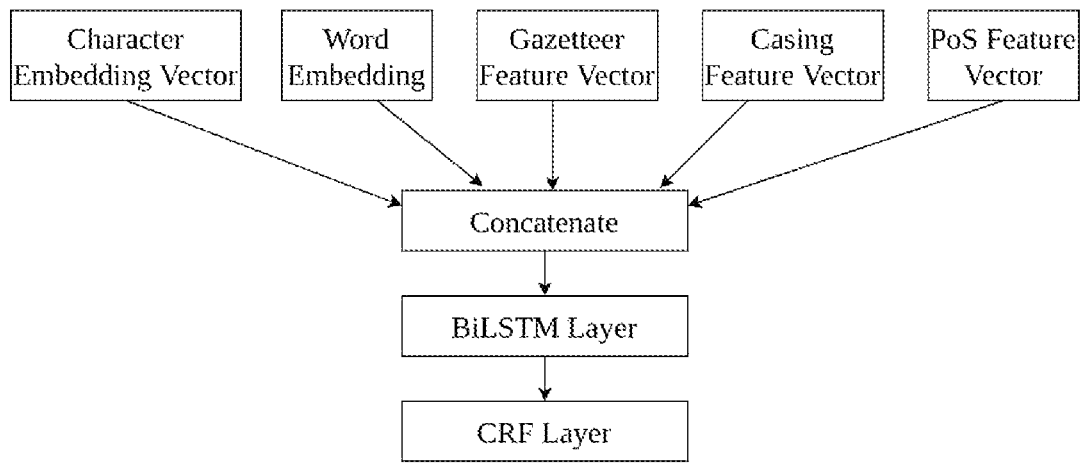
FIG. 6 is a block diagram of a second BiLSTM network, to obtain a trained named entity identification model, in accordance with some embodiments of the present disclosure.

Then, a second bi-directional long short term memory (BiLSTM) network is trained with (i) (a) the gazetteer feature vector, (b) the casing feature vector, (c) the part of speech (PoS) feature vector, (d) the character embedding vector, and (e) the word embedding, for each training fabrication procedure paragraph sentence word of the plurality of training fabrication procedure paragraph sentence words present in each training fabrication procedure paragraph sentence, at a time, of each training fabrication procedure paragraph, using the entity annotation for each training fabrication procedure paragraph sentence word, to obtain the trained named entity identification model. FIG. 6 is a block diagram of the second BiLSTM network, to obtain the trained named entity identification model, in accordance with some embodiments of the present disclosure. The training of the second BiLSTM for each training fabrication procedure paragraph sentence is further described in the below steps.

Firstly, (a) the gazetteer feature vector, (b) the casing feature vector, (c) the part of speech (PoS) feature vector, (d) the character embedding vector, and (e) the word embedding, corresponding to each training fabrication procedure paragraph sentence word, is concatenated to obtain a concatenated feature vector for the training fabrication procedure paragraph sentence word of the plurality of training fabrication procedure paragraph sentence words present in each training fabrication procedure paragraph sentence of the training fabrication procedure paragraph. Next, the concatenated feature vector for each training fabrication procedure paragraph sentence word of the plurality of training fabrication procedure paragraph sentence words present in each training fabrication procedure paragraph sentence of the training fabrication procedure paragraph, is passed, to a bi-directional long short term memory (BiLSTM) layer of the second BiLSTM network, to learn the hidden state for each training fabrication procedure paragraph sentence word.

Then, the hidden state for each training fabrication procedure paragraph sentence word of the plurality of training fabrication procedure paragraph sentence words present in each training fabrication procedure paragraph sentence of the training fabrication procedure paragraph, is passed to a conditional random field (CRF) layer of the second BiLSTM network, to obtain a predicted probability distribution, for each training fabrication procedure paragraph sentence of the training fabrication procedure paragraph. A probability function of the second BiLSTM network, is maximized, wherein the probability function of the second BiLSTM network is defined based on (i) the predicted probability distribution, for each training fabrication procedure paragraph sentence of the training fabrication procedure paragraph, and (i) an actual probability distribution for each training fabrication procedure paragraph sentence of the training fabrication procedure paragraph. The actual probability distribution for each training fabrication procedure paragraph sentence of the training fabrication procedure paragraph, is defined from the entity annotation for each training fabrication procedure paragraph sentence word of the plurality of training fabrication procedure paragraph sentence words present in each training fabrication procedure paragraph sentence of the training fabrication procedure paragraph. In an embodiment, the probability function of the second BiLSTM network is mathematically expressed as:

$$P(y|x) = \frac{1}{Z_x} \prod_{t=1}^{T} \psi_t(y_t | T_x) \psi_p(y_t, y_t - 1) \qquad (2)$$

where, $\psi_t$ is a local factor which computes output label score at each position t given only the representation at that position as computed by the second BiLSTM network i.e. $T_x$, $Z_x$ is the normalization constant; $\psi_p(y_t, y_t-1)$ denotes a factor that captures label transition scores for the CRF layer to account for the label dependencies. During the prediction, a dynamic programming based Viterbi algorithm is used by the second BiLSTM network to collectively predict the complete output label sequence for the training fabrication procedure paragraph sentence.

Lastly, weights of the second BiLSTM network are optimized, based on the probability function of the second BiLSTM network. Likewise, the second BiLSTM network is trained for each training fabrication procedure paragraph sentence of each training fabrication procedure paragraph of the plurality of training fabrication procedure paragraphs, to obtain the trained named entity identification model. Further, the trained named entity identification model may be validated to finetune the weights of the second BiLSTM network.

The trained named entity identification model is then used to identify one or more entities, for each pre-processed paragraph sentence of the plurality of pre-processed paragraph sentences associated with each fabrication procedure paragraph of the one or more fabrication procedure paragraphs. Firstly, (a) the gazetteer feature vector, (b) the casing feature vector, (c) the part of speech (PoS) feature vector, (d) the character embedding vector, and (e) the word embedding, for each pre-processed paragraph sentence word of the plurality of pre-processed paragraph sentence words present in each pre-processed paragraph sentence of the plurality of pre-processed paragraph sentences associated with each fabrication procedure paragraph, are obtained in the similar manner described during the training of the second BiLSTM network.

The gazetteer feature vector for each pre-processed paragraph sentence word, is obtained by defining the initial gazetteer feature vector with the plurality of predefined concepts. Then, the Boolean value for each predefined concept of the plurality of predefined concepts defined in the initial gazetteer feature vector, is assigned based on association of the predefined concept with the pre-processed paragraph sentence word. The casing feature vector for each pre-processed paragraph sentence word is the predefined casing type of the one or more predefined casing types, associated with the pre-processed paragraph sentence word. The PoS feature vector for each pre-processed paragraph sentence word is the predefined PoS type of the one or more predefined PoS types, associated with the pre-processed paragraph sentence word. The character embedding vector for pre-processed paragraph sentence word is the array of character embeddings associated with each character present in the pre-processed paragraph sentence word. The word embedding for each pre-processed paragraph sentence word is the embedding of the pre-processed paragraph sentence word.

Next, (a) the gazetteer feature vector, (b) the casing feature vector, (c) the part of speech (PoS) feature vector, (d) the character embedding vector, and (e) the word embedding, corresponding to each pre-processed paragraph sentence word are concatenated, to obtain the concatenated feature vector for each pre-processed paragraph sentence word of the plurality of each pre-processed paragraph sentence words present in each pre-processed paragraph sentence of the plurality of pre-processed paragraph sentences associated with each fabrication procedure paragraph of the one or more fabrication procedure paragraphs. Then, the concatenated feature vector for each pre-processed paragraph sentence word of the plurality of each pre-processed paragraph sentence words present in each pre-processed paragraph sentence of the plurality of pre-processed paragraph sentences associated with each fabrication procedure paragraph of the one or more fabrication procedure paragraphs, is passed, to the trained named entity identification model, to obtain the predicted probability distribution for each pre-processed paragraph sentence of the plurality of pre-processed paragraph sentences associated with each fabrication procedure paragraph. Lastly, the one or more entities out of the plurality of entities, for each pre-processed paragraph sentence of the plurality of pre-processed paragraph sentences associated with each fabrication procedure paragraph of the one or more fabrication procedure paragraphs, are identified, based on the predicted probability distribution for each pre-processed paragraph sentence of the plurality of pre-processed paragraph sentences associated with each fabrication procedure paragraph.

Figure 7:
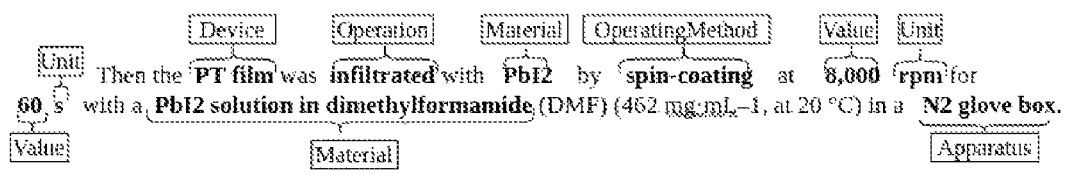
FIG. 7 illustrates one or more entities identified for an exemplary pre-processed paragraph sentence, by the trained named entity identification model, in accordance with some embodiments of the present disclosure.

FIG. 7 illustrates one or more entities identified for an exemplary pre-processed paragraph sentence, by the trained named entity identification model, in accordance with some embodiments of the present disclosure. The exemplary pre-processed paragraph sentence is taken from the exemplary fabrication procedure paragraph mentioned at step 306 of the method 300. As shown in FIG. 7, for the exemplary pre-processed paragraph sentence: 'Then the PT film was infiltrated with PbI2 by spin-coating at 8,000 rpm for 60 s with a PbI2 solution in dimethylformamide (DMF) (462 mg·mL−1, at 20° C.) in a N2 glove box', the one or more entities identified by the trained named entity identification model are: {PT film, infiltrated, PbI2, spin-coating, 8,000, rpm, 60, s, PbI2 solution in dimethylformamide, N2 glove box}. For example, the entity 'PT film' is the device and associated with the predefined concept Device. Similarly, the entity 'infiltrated' is a type of operation and associated with the predefined concept Operation, and so on. Note here that 'PbI2 solution in dimethylformamide' consists of multiple words, but still identified as single entity.

At step 310 of the method 300, the one or more hardware processors 104 of the system 100 are configured to identify one or more first predefined relations out of a first set of predefined relations, for each pre-processed paragraph sentence of the plurality of pre-processed paragraph sentences associated with each fabrication procedure paragraph of the one or more fabrication procedure paragraphs, by a trained relation identification model present in the relation identification unit 210, using the one or more entities identified at step 308 of the method 300, for each pre-processed paragraph sentence.

Further, the one or more hardware processors 104 of the system 100 are configured to identify one or more second predefined relations out of a second set of predefined relations, for each pre-processed paragraph sentence of the plurality of pre-processed paragraph sentences associated with each fabrication procedure paragraph of the one or more fabrication procedure paragraphs, by a set of predefined pattern expressions present in the relation identification unit 210, using the one or more entities identified at step 308 of the method 300, for each pre-processed paragraph sentence.

In an embodiment, the first set of predefined relations and the second set of predefined relations may be defined from the plurality of predefined relations captured from the knowledge representation meta model mentioned at step 308 of the method 300. In an embodiment, the first set of predefined relations include: inMaterial, outMaterial, inDevice, outDevice, and hasParam. In an embodiment, the second set of predefined relations include opApparatus, hasValue, hasUnit, hasProperty, opMethod, and opCondition.

In an embodiment, obtaining the trained relation identification model is described in the following steps. Firstly, one or more entities identified for each training fabrication procedure paragraph sentence of a plurality of training fabrication procedure paragraph sentences associated with each training fabrication procedure paragraph, are received. In an embodiment, the one or more entities for each training fabrication procedure paragraph sentence may be identified by using the trained named entity identification model obtained at step 308 of the method 300. One or more entity pairs are formed for each training fabrication procedure paragraph sentence, using the one or more entities corresponding to the training fabrication procedure paragraph sentence. Further, a predefined relation annotation out of the first set of predefined relation annotations, for each predefined entity pair of the one or more predefined entity pairs corresponding to each training fabrication procedure paragraph sentence associated with each training fabrication procedure paragraph, are received. The predefined relation annotation for each predefined entity pair, represents the predefined relation out of the plurality of predefined relations captured from the knowledge representation meta model, for each predefined entity pair. For example, the predefined relation outMaterial is the predefined relation annotation for the predefined entity pairs Operation and Material. Similarly, the predefined relation opApparatus is the predefined relation annotation for the predefined entity pairs Operation and Apparatus, and so on.

Next, one or more entity-level feature vectors and one or more entity-pair-level feature vectors, for each training fabrication procedure paragraph sentence of the plurality of training fabrication procedure paragraph sentences associated with each training fabrication procedure paragraph are extracted. The one or more entity-level feature vectors for each training fabrication procedure paragraph sentence, includes a first set of features associated with each predefined entity of the one or more entities identified for the training fabrication procedure paragraph sentence. In an embodiment, the first set of features associated with each predefined entity includes: (i) the entity (the training fabrication procedure paragraph sentence word) and the associated PoS (W, T), (ii) the word appears previous to the entity and the associated PoS (PW, PT), (iii) the word appears next to the entity and the associated PoS (NW, NT), (iv) the parent of the entity in a dependency tree and the associated PoS (Pa, PaT), (v) the named entity tag (the concept associated to the entity) (NE), and (vi) the dependency relation type between the entity and the parent (DR). The dependency tree represents grammatical structure of a sentence in terms of dependency relations between words. A dependency relation identifies a grammatical relation between the head word and the word that modifies the dependency. In an embodiment, the dependency tree may be created using a dependency parser.

The one or more entity-pair-level feature vectors for each training fabrication procedure paragraph sentence, includes a second set of features associated with each predefined entity pair for the training fabrication procedure paragraph sentence. In an embodiment, the second set of features associated with each predefined entity pair includes: (i) a word distance (WD), between the entity pair, (ii) tree distance (TD), between the entities in the dependency tree, (iii) common ancestor (CA) between the entities in the dependency tree, (iv) Ancestor position (AP), and (v) dependency path (DP) which defines sequence of relations between the entities in the dependency tree.

Figure 8:
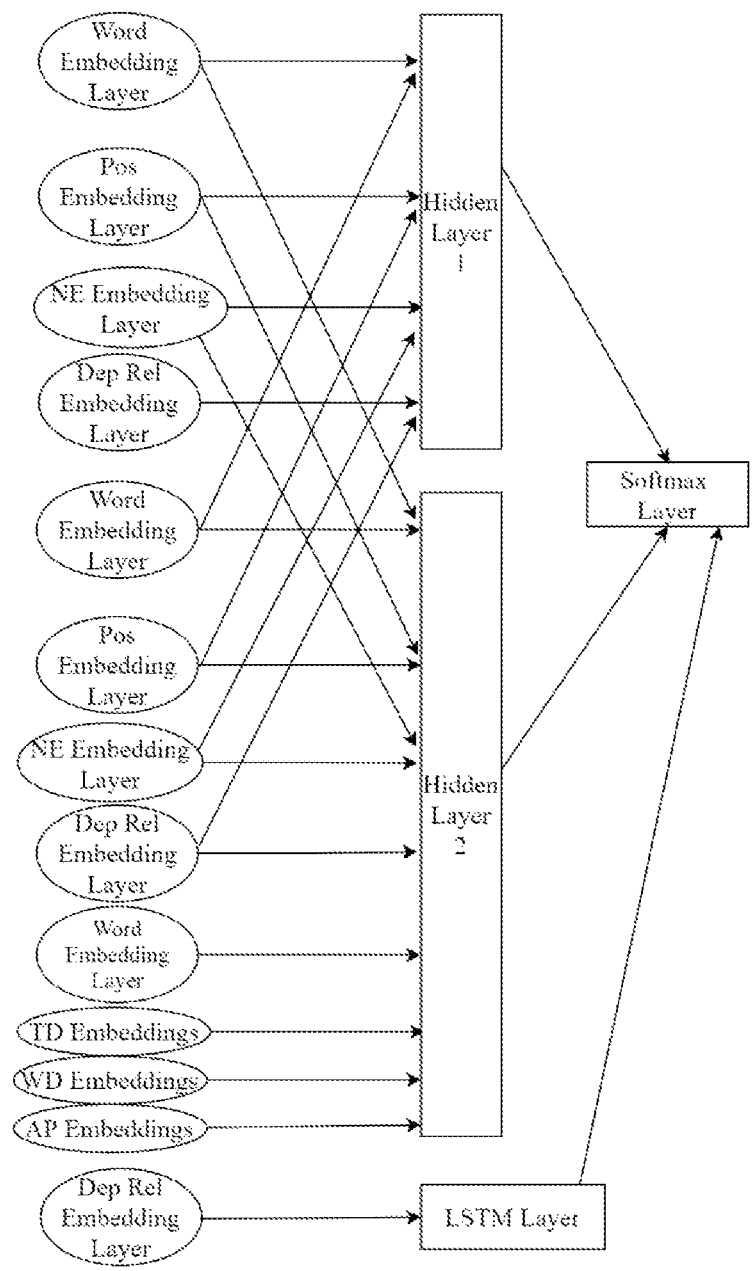
FIG. 8 is a block diagram of a hybrid neural network, to obtain a trained relation identification model, in accordance with some embodiments of the present disclosure.

Then, a hybrid neural network is trained with the one or more entity-level feature vectors and one or more entity-pair-level feature vectors, for each training fabrication procedure paragraph sentence of the plurality of training fabrication procedure paragraph sentences associated with each training fabrication procedure paragraph, to obtain the trained relation identification model, using the predefined relation annotation corresponding to each predefined entity pair. In an embodiment, the hybrid neural network includes a set of embedding layers, a first hidden layer, a second hidden layer, an LSTM layer and a soft-max layer. FIG. 8 is a block diagram of the hybrid neural network, to obtain the trained relation identification model, in accordance with some embodiments of the present disclosure. The training of the hybrid neural network for each training fabrication procedure paragraph sentence is described in the following steps.

Firstly, a set of entity embeddings for the one or more entity-level feature vectors and a set of entity-pair embeddings for the one or more entity-pair-level feature vectors, for each training fabrication procedure paragraph sentence, are obtained using the set of embedding layers of the hybrid neural network. Then, the set of entity embeddings for the one or more entity-level feature vectors are passed to the first hidden layer of the hybrid neural network. The set of entity-pair embeddings for the one or more entity-pair-level feature vectors are passed to the second hidden layer of the hybrid neural network. The dependency path (DP) of the second set of features is passes to the LSTM layer of the hybrid neural network. The output of the first hidden layer, the second hidden layer, and the LSTM layer are then passed to the soft-max layer of the hybrid neural network, to obtain a predicted probability distribution for each predefined entity pair out of the one or more entities identified for the training fabrication procedure paragraph sentence.

A categorical cross-entropy loss function of the hybrid neural network minimized, wherein the categorical cross-entropy loss function defined between (i) the predicted probability distribution for each predefined entity pair, and (ii) an actual probability distribution corresponding to the predefined entity pair. The actual probability distribution for each predefined entity pair is defined from the predefined relation annotation corresponding to the predefined entity pair. In an embodiment, the categorical cross-entropy loss function of the hybrid neural network is mathematically expressed as:

$$\text{Loss function} = -\Sigma_{i=1}^{N} y_i \cdot \log \hat{y}_i \quad (3)$$

wherein, $y_i$ is actual probability distribution for each predefined entity pair (the predefined relation annotation, and $\hat{y}_i$ is the predicted probability distribution for each predefined entity pair (the predicted relation), and N represents number of the plurality of predefined relation annotations.

Lastly, weights of the hybrid neural network are optimized, based on the categorical cross-entropy loss function of the hybrid neural network. Likewise, the hybrid neural network is trained for each training fabrication procedure paragraph sentence of each training fabrication procedure paragraph of the plurality of training fabrication procedure paragraphs, to obtain the trained relation identification model. Further, the trained relation identification model may be validated to finetune the weights of the hybrid neural network.

The trained relation identification model is then used to identify the one or more first predefined relations out of the first set of predefined relations, for each pre-processed paragraph sentence of the plurality of pre-processed paragraph sentences associated with each fabrication procedure paragraph, using the one or more entities identified for each pre-processed paragraph sentence. Firstly, the one or more entity-level feature vectors and the one or more entity-pair-level feature vectors, for each pre-processed paragraph sentence, are obtained in the similar manner described during the training of the hybrid neural network. The one or more entity-level feature vectors for each pre-processed paragraph sentence, includes a first set of features associated with each predefined entity of the one or more entities identified for each pre-processed paragraph sentence. The one or more entity-pair-level feature vectors for each pre-processed paragraph sentence, includes a second set of features associated with each predefined entity pair out of the one or more entities identified for the pre-processed paragraph sentence.

Table 2 shows the set of features associated with two entities 'infiltrated' and 'spin-coating' that are present in the exemplary pre-processed paragraph sentence: 'Then the PT film was infiltrated with PbI2 by spin-coating at 8,000 rpm for 60 s with a PbI2 solution in dimethylformamide (DMF) (462 mg·mL−1, at 20° C.) in a N2 glove box' of the exemplary fabrication procedure paragraph mentioned at step 306 of the method 300. The set of features are then used to obtain the entity-level feature vectors.

TABLE 2

| Feature | Feature Value for Entity 1 (infiltrated) | Feature Value for Entity 2 (PT film) |
| --- | --- | --- |
| Entity (W) | Infiltrated | PT film |
| Next Word (NW) | With | Was |
| Previous Word (PW) | was | The |
| Parent (Pa) | NIL | infiltrated |
| Entity PoS (T) | VBN | NN NN |
| Next Word PoS (NT) | IN | VBD |
| Previous Word PoS (PT) | VBD | DT |

TABLE 2-continued

| Feature | Feature Value for Entity 1 (infiltrated) | Feature Value for Entity 2 (PT film) |
| --- | --- | --- |
| Parent PoS (PaT) | NIL | VBN |
| NE Tag (NE) | Operation | device |
| Dependency Relation (DR) | NIL | Nsubjpass |

Table 3 shows the set of features associated with entity pair 'infiltrated' and 'spin-coating' that are present in the exemplary pre-processed paragraph sentence: 'Then the PT film was infiltrated with PbI2 by spin-coating at 8,000 rpm for 60 s with a PbI2 solution in dimethylformamide (DMF) (462 mg·mL−1, at 20° C.) in a N2 glove box' of the exemplary fabrication procedure paragraph mentioned at step 306 of the method 300. The set of features are then used to obtain the entity-pair-level feature vectors.

TABLE 3

| Feature | Feature value |
| --- | --- |
| Word Distance (WD) | 1 |
| Tree Distance (TD) | 1 |
| Common Ancestor (CA) | Infiltrated |
| Ancestor Position (AP) | 5 |
| Dependency Path (DP) | Nsubjpass |

Then, the one or more entity-level feature vectors and the one or more entity-pair-level feature vectors, for each pre-processed paragraph, are passed, to the trained relation identification model, to obtain the predicted probability distribution for each predefined entity pair corresponding to the pre-processed paragraph sentence. Lastly, the one or more first predefined relations for each pre-processed paragraph sentence, are identified, based on the predicted probability distribution for each predefined entity pair out of the one or more entities identified for the pre-processed paragraph sentence.

Further, the one or more hardware processors 104 of the system 100 are configured to identify one or more second predefined relations out of a second set of predefined relations, for each pre-processed paragraph sentence of the plurality of pre-processed paragraph sentences associated with each fabrication procedure paragraph of the one or more fabrication procedure paragraphs, by a set of predefined pattern expressions present in the relation identification unit 210, using the one or more entities identified at step 308 of the method 300, for each pre-processed paragraph sentence.

In an embodiment, the set of predefined pattern expressions are generated using pattern application programming interfaces (API) such as a TokensRegex API, a Semgrex API, and so on, using the entities, the PoS features of the entities, the word level features, and the dependency path based features. Table 4 shows an exemplary pattern expression for some of the second set of predefined relations.

TABLE 4

| Relation | Pattern expression |
| --- | --- |
| hasUnit | ([{tag:CD}\|{ner:/conditionVal\|paramVal\|propVal\|matQuantity Val/}])([{ner:"unit"}]) |
| opApparatus | {ner:/operation\|method/}=operation>/nmod:through/ {ner:/apparatus/}=apparatus); {ner:/operation/}=operation</.\*/ ({word:/carried/}>/nmod:in/ {ner:/apparatus/}=apparatus) |

TABLE 4-continued

| Relation | Pattern expression |
| --- | --- |
| hasValue | ([{tag:CD}])[word:/:/]([[tag:CD}])[[ner:/unit/}][word:/solution\|suspension/][word:/of/]<br>[{ner:/solvent\|material/}])[word:/in\|:/]([{ner:/solvent\|material/}]) |
| opMethod | ([{ner:/operation/}])[!{ner:/operation\|method/}]*([{ner:/method/}]) |
| hasProperty | {ner:/property/}=prop>/nmod:of\amod/{ner:/device\|material\|solute\|solvent/}=device |
| opCondition | {ner:/method\|operation/}=method>/nmod:at/({ner:/unit/}>/nmod:for/({ner:/unit/} >/nmod:(under\|in)\|amod/{ner:/condition/}=condition)) |

The one or more first predefined relations identified using the trained relation identification model, and the one or more second predefined relations identified using the set of predefined pattern expressions forms a set of relations for each pre-processed paragraph sentence of the plurality of pre-processed paragraph sentences associated with each fabrication procedure paragraph.

Figure 9A:
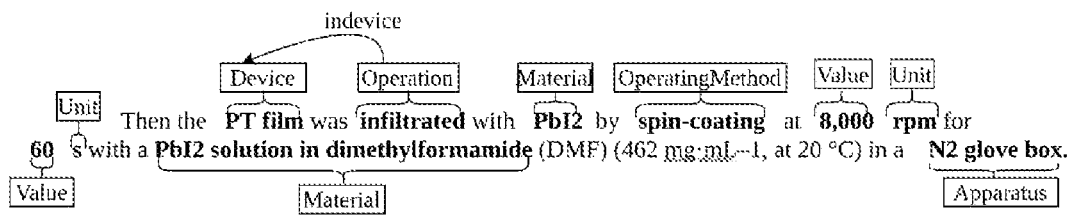
FIG. 9A illustrates one or more first predefined relations identified for the exemplary pre-processed paragraph sentence, by the trained relation identification model, in accordance with some embodiments of the present disclosure.

FIG. 9A illustrates one or more first predefined relations identified for the exemplary pre-processed paragraph sentence, by the trained relation identification model, in accordance with some embodiments of the present disclosure. As shown in FIG. 9A, for the exemplary pre-processed paragraph sentence: 'Then the PT film was infiltrated with PbI2 by spin-coating at 8,000 rpm for 60 s with a PbI2 solution in dimethylformamide (DMF) (462 mg·mL−1, at 20° C.) in a N2 glove box', the predefined relation indevice is identified for the entity pair 'PT film' and 'infiltrated', by the trained relation identification model, based on the predefined concepts Device and Operation, associated with the entities. Similarly, other first predefined relations are identified for each entity pair based on the association.

Figure 9B:
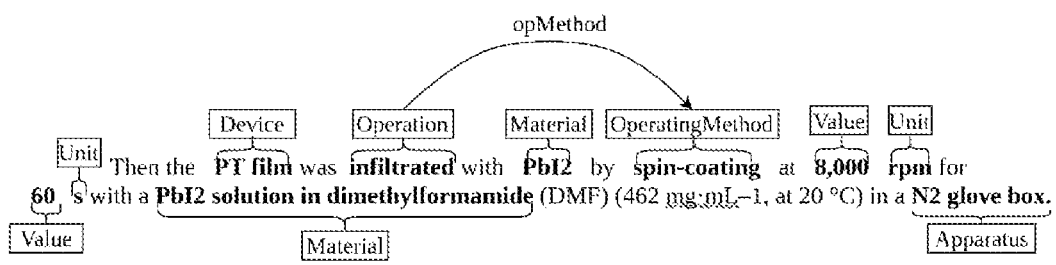
FIG. 9B illustrates one or more second predefined relations identified for the exemplary pre-processed paragraph sentence, by a set of predefined pattern expressions, in accordance with some embodiments of the present disclosure.

FIG. 9B illustrates one or more second predefined relations identified for the exemplary pre-processed paragraph sentence, by a set of predefined pattern expressions, in accordance with some embodiments of the present disclosure. As shown in FIG. 9B, for the exemplary pre-processed paragraph sentence: 'Then the PT film was infiltrated with PbI2 by spin-coating at 8,000 rpm for 60 s with a PbI2 solution in dimethylformamide (DMF) (462 mg·mL−1, at 20° C.) in a N2 glove box', the predefined relation opMethod is identified for the entity pair 'infiltrated' and 'spin-coating', by the set of predefined pattern expressions, based on the predefined concepts Operation and OperatingMethod, associated with the entities. Similarly, other second predefined relations are identified for each entity pair based on the association.

Figure 9C:
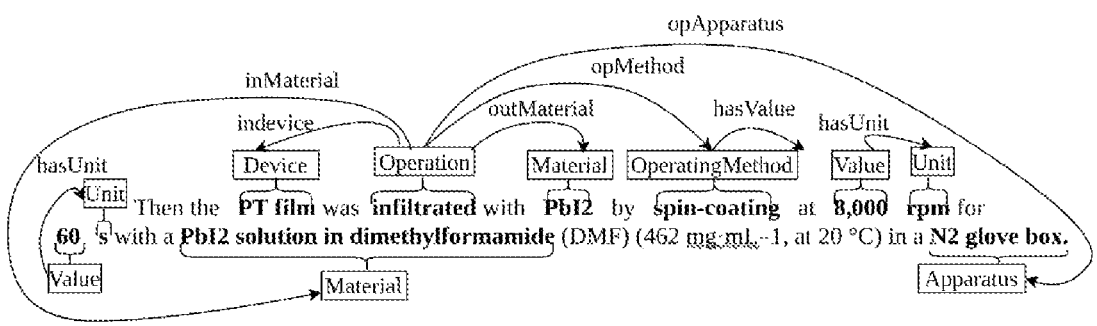
FIG. 9C illustrates the one or more first predefined relations and the one or more second predefined relations, identified for the exemplary pre-processed paragraph sentence, in accordance with some embodiments of the present disclosure.

FIG. 9C illustrates the one or more first predefined relations and the one or more second predefined relations, identified for the exemplary pre-processed paragraph sentence, in accordance with some embodiments of the present disclosure. As shown in FIG. 9C, the first predefined relations and the second predefined relations identified for the exemplary pre-processed paragraph sentence: 'Then the PT film was infiltrated with PbI2 by spin-coating at 8,000 rpm for 60 s with a PbI2 solution in dimethylformamide (DMF) (462 mg·mL−1, at 20° C.) in a N2 glove box', are {inMaterial, opApparatus, opMethod, outMaterial, hasValue, hasUnit, indevice} for the corresponding entity pairs.

At step 312 of the method 300, the one or more hardware processors 104 of the system 100 are configured to identify device fabrication procedure for each fabrication procedure paragraph of the one or more fabrication procedure paragraphs, through the device fabrication procedure extraction unit 212. The device fabrication procedure extraction unit 212 includes a rule based unsupervised algorithm which is used to identify device fabrication procedure for each fabrication procedure paragraph using the one or more entities identified at step 308 of the method, for the pre-processed paragraph sentence. The device fabrication procedure for each fabrication procedure paragraph, includes a sequence of operations associated with the fabrication process.

The rule based unsupervised algorithm links the operations in the order in which they are mentioned in each fabrication procedure paragraph. First, the one or more entities associated with the predefined concept Operation, identified for each pre-processed paragraph sentence by the trained named entity identification model, at step 308 of the method 300, are captured. Then, a relation next is assigned between each consecutive entities associated with the predefined concept Operation, that appear next to each other in the textual order.

Figure 10:
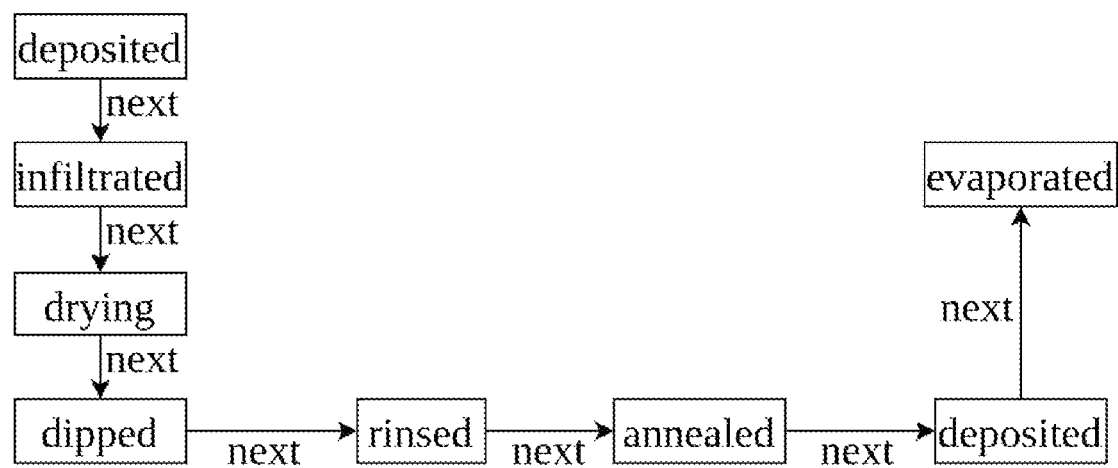
FIG. 10 illustrates a device fabrication procedure identified for an exemplary fabrication procedure paragraph, in accordance with some embodiments of the present disclosure.

FIG. 10 illustrates a device fabrication procedure identified for an exemplary fabrication procedure paragraph, in accordance with some embodiments of the present disclosure. As shown in FIG. 10, the device fabrication procedure identified for the exemplary fabrication procedure paragraph mentioned at step 306 of the method 300 describes the sequence of operations present in the exemplary fabrication procedure paragraph, in the sequential order.

At step 314 of the method 300, the one or more hardware processors 104 of the system 100 are configured to generate an operation sequence knowledge graph for each fabrication procedure paragraph of the one or more fabrication procedure paragraphs, through the operation sequence knowledge graph unit 214. In an embodiment, the operation sequence knowledge graph unit 214 includes a graph database tool that may be used to generate the operation sequence knowledge graph for each fabrication procedure paragraph of the one or more fabrication procedure paragraphs. The graph database tool utilizes (i) the one or more entities identified for each pre-processed paragraph sentence of the plurality of pre-processed paragraph sentences associated with each fabrication procedure paragraph, at step 308 of the method 300, (ii) (a) the one or more first predefined relations the one or more second predefined relations identified for each pre-processed paragraph sentence of the plurality of pre-processed paragraph sentences associated with each fabrication procedure paragraph at step 310 of the method 300, and (iii) the device fabrication procedure for each fabrication procedure paragraph, at step 312 of the method 300, to generate the operation sequence knowledge graph for each fabrication procedure paragraph. The operation sequence knowledge graph is a knowledge graph consists of the identified entities and the identified relations between them.

The knowledge representation meta model specifies the type information for the identified entities and the identified relations.

Figure 11:
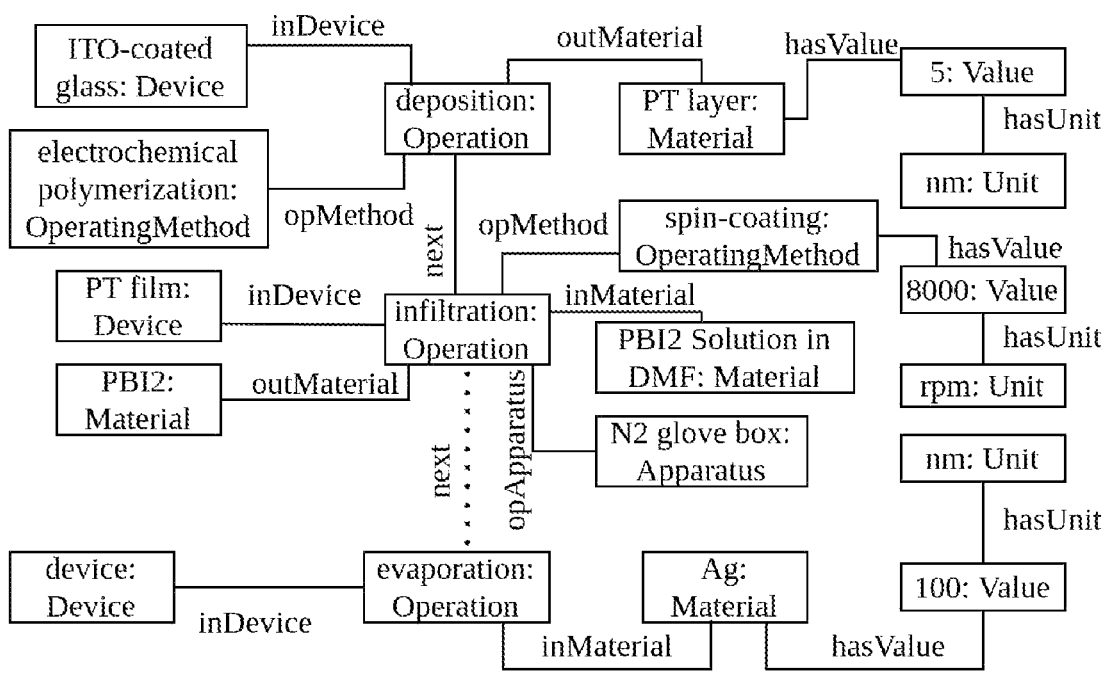
FIG. 11 illustrates an operation sequence knowledge graph for the exemplary fabrication procedure paragraph, in accordance with some embodiments of the present disclosure.

FIG. 11 illustrates an operation sequence knowledge graph for the exemplary fabrication procedure paragraph, in accordance with some embodiments of the present disclosure. As shown in FIG. 11, the operation sequence knowledge graph generated for the exemplary fabrication procedure paragraph mentioned at step 306 of the method 300 describes, the sequence of operations, operating methods, operating parameters, operating devices, and so on.

At step 316 of the method 300, the one or more hardware processors 104 of the system 100 are configured to build the analytical platform to enable the device fabrication, for the device category, using the operation sequence knowledge graph for each fabrication procedure paragraph of the one or more fabrication procedure paragraphs, through the analytical platform unit 216. In an embodiment, the analytical platform unit 216 includes a graph search engine such as Neo4j, OrientDB, ArangoDB, DGraph, that may be used to build the analytical platform to enable the device fabrication. In an embodiment, the analytical platform includes but are not limited to a graph search platform, a knowledge query engine, a question-answer (QA) platform, and a virtual chatbot.

The analytical platform may be queried to make informed decisions during the device fabrication of the new devices. For example, if the material designer wants to fabricate a solar cell with $V_{oc}$ of 1.15 V among other standard characteristics and decides to use MaPbBr$_3$ perovskite. A suitable query is formed and queried to the analytical platform to identify the solar cells with similar characteristics. Further, analyzing the available devices and the respective device fabrication present in the domain knowledge helps the material designer narrow down the design space of materials, operations, and the operating conditions. In another example, if the material designer wishes to carry out the device fabrication in air as opposed to the standard practice of using a glove box. The resulted information from the analytical platform may be utilized to narrow down the design space further.

The question-answer (QA) platform may be built using the operation sequence knowledge graphs associated with the one or more fabrication procedure paragraphs, utilizing the graph search engine. The question-answer (QA) platform may be achieved by adding a query language platform such as structured query language (SQL) tool, SPARQL Protocol and RDF Query Language tools. Typical questions that device fabrication engineers are typically interested in consist of what operations should be performed to achieve desired performance characteristics of the device, what sequence of operations should be performed, what type and amount of materials should be used in a particular operation, and so on. Some of the exemplary questions for extracting the information related to the solar cell fabrication includes:

1. What are the different types of cleaning methods used when the substrate under consideration is either FTO or ITO?
2. What thickness of gold electrode can be used to obtain a power conversion efficiency in the range of 15-25%?
3. What are the parameter set points (speed and time) for spin coating MAPbI$_3$ solution, in order to achieve an open circuit voltage in the range of (write the specific range)?
4. What happens to short circuit current when the perovskite material in question is rotated for lower duration (<10 seconds) and annealed at higher temperature range (>100 Degree C.)
5. What is the range of quantities used for precursor materials while synthesizing the light absorbing material in question? For instance, for synthesis of MAPbI$_3$, what are the quantities of PbI2 and MAI used?
6. What are different methods used for various operations like cleaning, coating, depositing, annealing etc.?
7. What is range of temperatures used for annealing for the light absorbing material in question?
8. What is the effect of thickness of gold electrode while thermally evaporating it at higher temperature for longer duration?

Further, the graph search platform may be built using the operation sequence knowledge graphs associated with the one or more fabrication procedure paragraphs, utilizing the graph search engine such as OrientDB. The OrientDB is a NoSql database system that has inherent support for graphs. The OrientDB contains two base classes i.e. Vertex class to represent nodes (concepts) and Edge class to represent edges (relations). In an embodiment, the knowledge representation meta model shown in FIG. 5 may be used to create a knowledge graph (KG) schema for storing the operation sequence knowledge graphs associated with the one or more fabrication procedure paragraphs. Particularly, for each predefined concept mentioned in the knowledge representation meta model, a subclass of Vertex class in the OrientDB is generated. Similarly, for each predefined relation mentioned in the knowledge representation meta model, a subclass of Edge class in the OrientDB is generated. The generated subclasses are used to create the knowledge graph (KG) schema for storing the operation sequence knowledge graphs associated with the one or more fabrication procedure paragraphs.

For example, for an exemplary fabrication procedure paragraph sentence: 'ethanol is a material that is used in a cleaning operation, a material instance 'ethanol' is created, and the corresponding type is set to the concept Material. Similarly, the operation instance 'cleaning' is created, and the corresponding type is set to the concept Operation. These two created instances are then connected using the instance of the relation 'inMaterial'. The created instances are then used to create the KG graph for storing the operation sequence knowledge graphs in the OrientDB.

The built OrientDB is then used as the analytical platform that supports a query and analytics support on the stored data. The analytical platform uses a SQL like graph query language to query the stored operation sequence knowledge graphs. For example, for the question: 'What are different methods used for deposition operation and their locations?, the graph query may be: 'match {class:method, as:meth}.in ('opMethod'){class:operation, as:op, where: (name='deposition')} RETURN meth'. The graph query first looks for all the operation nodes having name='deposition'. Then looks for edges labeled with 'opMethod' to find the corresponding method nodes. The analytical platform then lists down the method nodes. The material designer may select any such method node to get its location information such as the file name, procedure text, sentence where the method is mentioned etc. Further, the material designer can also traverse in/out edges from the method node to identify the associated parameters, apparatus, etc.

In another example, for the question: 'What is the frequency distribution of the used methods?, the graph query may be: 'select count(*) from (match {class:method, as:meth}.in('opMethod'){class:operation, as:op, where: (name='deposition')} RETURN distinct meth.name)'. The graph query in addition to providing list of method nodes, groups the method name and lists down the number of procedures in which these methods were mentioned. Table 5 shows an exemplary output of the SQL query:

TABLE 5

| Operation name | Number of Fabrication procedures |
|---|---|
| Spin - coating | 60 |
| Thermal Evaporation | 30 |

In accordance with an embodiment of the present disclosure, the method and systems build the analytical platform using the domain knowledge of the device fabrication process for each device category. The analytical platform is quick, effective and efficient to retrieve the required knowledge related to the fabrication process in the structured format. Hence the time and efforts of material engineers and the design engineers are reduced in finding the relevant knowledge out of the existing literature for fabricating the new devices. The analytical platform may also help the material engineers and the design engineers for enabling synthesis of the new functional materials for meeting the desired properties and performance of the fabricated devices. The analytical platform is simple in design and hence any fabrication individual may be used for enabling the device fabrication.

Further, the analytical platform may be used for monitoring and diagnosing the fabrication process and the fabricating apparatus while the fabrication process is being performed. This helps in improving the productivity of the new devices.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising the steps of:
   receiving, via one or more hardware processors, (i) a device category associated with a device fabrication, (ii) one or more device fabrication knowledge documents associated with the device category from a device fabrication knowledge repository, wherein each device fabrication knowledge document comprises a plurality of document paragraphs, wherein each document paragraph comprises one or more paragraph sentences, and each paragraph sentence comprises a plurality of paragraph sentence words;
   pre-processing, via the one or more hardware processors, each device fabrication knowledge document of the one or more device fabrication knowledge documents, to obtain: (i) a plurality of pre-processed document paragraphs, in a plain text format, (ii) a section header for each pre-processed document paragraph of the plurality of pre-processed document paragraphs, wherein each pre-processed document paragraph comprises a plurality of pre-processed paragraph sentences, and wherein each pre-processed paragraph sentence comprises a plurality of pre-processed paragraph sentence words;

identifying, via the one or more hardware processors, one or more fabrication procedure paragraphs out of the plurality of pre-processed document paragraphs, by a trained fabrication procedure paragraph classification model, using the section header for each pre-processed document paragraph of the plurality of pre-processed document paragraphs, wherein each pre-processed document paragraph of the plurality of pre-processed document paragraphs is a fabrication procedure paragraph, if the pre-processed document paragraph comprises information related to a fabrication procedure;

identifying, via the one or more hardware processors, one or more entities, for each pre-processed paragraph sentence of the plurality of pre-processed paragraph sentences associated with each fabrication procedure paragraph of the one or more fabrication procedure paragraphs, by a trained named entity identification model, wherein the plurality of entities are associated with a plurality of predefined concepts related to the fabrication procedure;

identifying, via the one or more hardware processors, (i) one or more first predefined relations out of a first set of predefined relations, and (ii) one or more second predefined relations out of a second set of predefined relations, for each pre-processed paragraph sentence of the plurality of pre-processed paragraph sentences associated with each fabrication procedure paragraph of the one or more fabrication procedure paragraphs, by (i) a trained relation identification model, and (ii) a set of predefined pattern expressions, respectively, using the one or more entities identified for each pre-processed paragraph sentence;

identifying, via the one or more hardware processors, a device fabrication procedure for each fabrication procedure paragraph of the one or more fabrication procedure paragraphs, by a rule based unsupervised algorithm, using the one or more entities identified for each pre-processed paragraph sentence of the plurality of pre-processed paragraph sentences associated with each fabrication procedure paragraph, wherein the device fabrication procedure for each fabrication procedure paragraph, comprises a sequence of operations; and generating, via the one or more hardware processors, an operation sequence knowledge graph for each fabrication procedure paragraph of the one or more fabrication procedure paragraphs, using (i) the one or more entities identified for each pre-processed paragraph sentence of the plurality of pre-processed paragraph sentences associated with each fabrication procedure paragraph of the one or more fabrication procedure paragraphs, (ii) (a) the one or more first predefined relations out of the first set of predefined relations, and (b) the one or more second predefined relations out of the second set of predefined relations, identified for each pre-processed paragraph sentence of the plurality of pre-processed paragraph sentences associated with each fabrication procedure paragraph of the one or more fabrication procedure paragraphs, and (iii) the device fabrication procedure for each fabrication procedure paragraph of the one or more fabrication procedure paragraphs, using a graph database tool.

2. The method of claim 1, further comprising the step of building, via the one or more hardware processors, an analytical platform to enable the device fabrication, using the operation sequence knowledge graph for each fabrication procedure paragraph of the one or more fabrication procedure paragraphs, in a graph search engine.

3. The method of claim 1, wherein the trained fabrication procedure paragraph classification model is obtained by:

receiving (i) a plurality of training document paragraphs associated with the device category, in the plain text format, (ii) the section header for each training document paragraph of the plurality of training document paragraphs, and (iii) an annotation class for each training document paragraph of the plurality of training document paragraphs, wherein each training document paragraph comprises a plurality of training document paragraph sentences, and each training document paragraph sentence comprises a plurality of training document paragraph sentence words, and wherein the annotation class for each training document paragraph is one of: (a) the fabrication procedure paragraph, and (b) a non-fabrication procedure paragraph;

obtaining: (a) a paragraph text vector, (b) a dictionary feature vector, and (c) a section header feature vector, for each training document paragraph of the plurality of training document paragraphs, wherein:

(a) the paragraph text vector for each training document paragraph comprises an embedding for each training document paragraph sentence word of the plurality of training document paragraph sentence words corresponding to each training document paragraph sentence of the plurality of training document paragraph sentences corresponding to the training document paragraph;

(b) the dictionary feature vector for each training document paragraph is obtained by: (i) defining an initial dictionary feature vector with a plurality of predefined keywords, and (ii) assigning a Boolean value for each predefined keyword of the plurality of predefined keywords defined in the initial dictionary feature vector, based on presence of the predefined keyword in the training document paragraph; and (c) the section header feature vector for each training document paragraph of the plurality of training document paragraphs, is obtained by: (i) defining an initial section header feature vector with a plurality of predefined section headers, and (ii) assigning the Boolean value for each predefined section header of the plurality of predefined section headers defined in the initial section header feature vector, based on matching of the predefined section header with the section header of the training document paragraph; and training a first bi-directional long short term memory (BiLSTM) network with: (i) (a) the paragraph text vector, (b) the dictionary feature vector, and (c) the section header feature vector, for each training document paragraph, at a time, of the plurality of training document paragraphs, and (ii) the annotation class for each training document paragraph of the plurality of training document paragraphs, to obtain the trained fabrication procedure paragraph classification model, wherein training the first BiLSTM network with each training document paragraph comprises:

passing the paragraph text vector corresponding to the training document paragraph, as an input to a bi-directional long short term memory (BiLSTM) layer of the first BiLSTM network, to learn a hidden state of a first training document paragraph sentence word and the hidden state of a last training document paragraph sentence word, present in the training document paragraph;

concatenating the dictionary feature vector and the section header feature vector, corresponding to the training document paragraph, with the hidden state of the first training document paragraph sentence word and the hidden state of the last training document paragraph sentence word, present in the training document paragraph, to obtain a concatenated feature vector of the training document paragraph;

passing the concatenated feature vector of the training document paragraph to a soft-max layer of the first BiLSTM network to obtain a predicted probability value of the training document paragraph;

minimizing a binary cross-entropy loss function of the first BiLSTM network, defined between the (i) the predicted probability value of the training document paragraph, and (ii) an actual probability value of the training document paragraph, wherein the actual probability value of the training document paragraph is defined from the annotation class corresponding to the training document paragraph; and optimizing weights of the first BiLSTM network, based on the binary cross-entropy loss function of the first BiLSTM network.

4. The method of claim 1, wherein identifying the one or more fabrication procedure paragraphs out of the plurality of pre-processed document paragraphs, by the trained fabrication procedure paragraph classification model, using the section header for each pre-processed document paragraph of the plurality of pre-processed document paragraphs, further comprises:

obtaining: (a) a paragraph text vector, (b) a dictionary feature vector, and (c) a section header feature vector, for each pre-processed document paragraph of the plurality of pre-processed document paragraphs, wherein:

(a) the paragraph text vector for each pre-processed document paragraph comprises an embedding for each pre-processed paragraph sentence word of the plurality of pre-processed paragraph sentence words corresponding to each pre-processed paragraph sentence of the plurality of pre-processed paragraph sentences corresponding to the pre-processed document paragraph;

(b) the dictionary feature vector for each pre-processed document paragraph is obtained by: (i) defining an initial dictionary feature vector with a plurality of predefined keywords, and (ii) assigning a Boolean value for each predefined keyword of the plurality of predefined keywords defined in the initial dictionary feature vector, based on presence of the predefined keyword in the pre-processed document paragraph; and (c) the section header feature vector for each pre-processed document paragraph is obtained by: (i) defining an initial section header feature vector with a plurality of predefined section headers, and (ii) assigning the Boolean value for each predefined section header of the plurality of predefined section headers defined in the initial section header feature vector, based on matching of the predefined section header with the section header of the pre-processed document paragraph;

passing: (a) the paragraph text vector, (b) the dictionary feature vector, and (c) the section header feature vector, for each pre-processed document paragraph of the plurality of pre-processed document paragraphs, to the trained fabrication procedure paragraph classification model, to obtain a predicted probability value for each pre-processed document paragraph of the plurality of pre-processed document paragraphs; and identifying the one or more fabrication procedure paragraphs out of the plurality of pre-processed document paragraphs, based on the predicted probability value corresponding to each pre-processed document paragraph of the plurality of pre-processed document paragraphs.

5. The method of claim 1, wherein the trained named entity identification model is obtained by:

receiving (i) a plurality of training fabrication procedure paragraphs, wherein each training fabrication procedure paragraph comprises a plurality of training fabrication procedure paragraph sentences, and each training fabrication procedure paragraph sentence comprises a plurality of training fabrication procedure paragraph sentence words, (ii) an entity annotation for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs;

obtaining: (a) a gazetteer feature vector, (b) a casing feature vector, (c) a part of speech (PoS) feature vector, (d) a character embedding vector, and (e) a word embedding, for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs, wherein:

(a) the gazetteer feature vector for each training fabrication procedure paragraph sentence word, is obtained by: (i) defining an initial gazetteer feature vector with a plurality of predefined concepts, and (ii) assigning a Boolean value for each predefined concept of the plurality of predefined concepts defined in the initial gazetteer feature vector, based on association of the predefined concept with the training fabrication procedure paragraph sentence word;

(b) the casing feature vector for each training fabrication procedure paragraph sentence word is a predefined casing type of one or more predefined casing types, associated with the training fabrication procedure paragraph sentence word;

(c) the PoS feature vector for each training fabrication procedure paragraph sentence word is a predefined PoS type of one or more predefined PoS types, associated with the training fabrication procedure paragraph sentence word;

(d) the character embedding vector for each training fabrication procedure paragraph sentence word is an array of character embeddings associated with each character present in the training fabrication procedure paragraph sentence word; and (e) the word embedding for each training fabrication procedure paragraph sentence word is an embedding of the training fabrication procedure paragraph sentence word; and training a second bi-directional long short term memory (BiLSTM) network with (i) (a) the gazetteer feature vector, (b) the casing feature vector, (c) the part of speech (PoS) feature vector, (d) the character embedding vector, and (e) the word embedding, for each training fabrication procedure paragraph sentence word of the plurality of training fabrication procedure paragraph sentence words present in each training fabrication procedure paragraph sentence, at a time, of each training fabrication procedure paragraph of the plurality of training fabrication procedure paragraphs, and (ii) the entity annotation for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs, to obtain the trained named entity identification model, wherein training the second BiLSTM network with each training fabrication procedure paragraph comprises:

concatenating (a) the gazetteer feature vector, (b) the casing feature vector, (c) the part of speech (PoS) feature vector, (d) the character embedding vector, and (e) the word embedding, corresponding to each training fabrication procedure paragraph sentence word, to obtain a concatenated feature vector for each training fabrication procedure paragraph sentence word of the plurality of training fabrication procedure paragraph sentence words present in each training fabrication procedure paragraph sentence of the training fabrication procedure paragraph;

passing the concatenated feature vector for each training fabrication procedure paragraph sentence word of the plurality of training fabrication procedure paragraph sentence words present in each training fabrication procedure paragraph sentence of the training fabrication procedure paragraph, to a bi-directional long short term memory (BiLSTM) layer of the second BiLSTM network, to learn a hidden state for each training fabrication procedure paragraph sentence word of the plurality of training fabrication procedure paragraph sentence words present in each training fabrication procedure paragraph sentence of the training fabrication procedure paragraph;

passing the hidden state for each training fabrication procedure paragraph sentence word of the plurality of training fabrication procedure paragraph sentence words present in each training fabrication procedure paragraph sentence of the training fabrication procedure paragraph, to a conditional random field (CRF) layer of the second BiLSTM network, to obtain a predicted probability distribution, for each training fabrication procedure paragraph sentence of the training fabrication procedure paragraph;

maximizing a probability function of the second BiLSTM network, defined based on (i) the predicted probability distribution, for each training fabrication procedure paragraph sentence of the training fabrication procedure paragraph, and (i) an actual probability distribution for each training fabrication procedure paragraph sentence of the training fabrication procedure paragraph, wherein the actual probability distribution for each training fabrication procedure paragraph sentence of the training fabrication procedure paragraph, is defined from the entity annotation for each training fabrication procedure paragraph sentence word of the plurality of training fabrication procedure paragraph sentence words present in each training fabrication procedure paragraph sentence of the training fabrication procedure paragraph; and optimizing weights of the second BiLSTM network, based on the probability function of the second BiLSTM network.

6. The method of claim 1, wherein identifying the one or more entities out of the plurality of entities, for each pre-processed paragraph sentence of the plurality of pre-processed paragraph sentences associated with each fabrication procedure paragraph of the one or more fabrication procedure paragraphs, using the trained named entity identification model, further comprises;

obtaining: (a) a gazetteer feature vector, (b) a casing feature vector, (c) a part of speech (PoS) feature vector, (d) a character embedding vector, and (e) a word embedding, for each pre-processed paragraph sentence word of the plurality of pre-processed paragraph sentence words present in each pre-processed paragraph sentence of the plurality of pre-processed paragraph sentences associated with each fabrication procedure paragraph of the one or more fabrication procedure paragraphs, wherein:

(a) the gazetteer feature vector for each pre-processed paragraph sentence word, is obtained by: (i) defining an initial gazetteer feature vector with a plurality of predefined concepts, and (ii) assigning a Boolean value for each predefined concept of the plurality of predefined concepts defined in the initial gazetteer feature vector, based on association of the predefined concept with the pre-processed paragraph sentence word;

(b) the casing feature vector for each pre-processed paragraph sentence word is a predefined casing type of one or more predefined casing types, associated with the pre-processed paragraph sentence word;

(c) the PoS feature vector for each pre-processed paragraph sentence word is a predefined PoS type of one or more predefined PoS types, associated with the pre-processed paragraph sentence word;

(d) the character embedding vector for pre-processed paragraph sentence word is an array of character embeddings associated with each character present in the pre-processed paragraph sentence word; and (e) the word embedding for each pre-processed paragraph sentence word is an embedding of the pre-processed paragraph sentence word;

concatenating (a) the gazetteer feature vector, (b) the casing feature vector, (c) the part of speech (PoS) feature vector, (d) the character embedding vector, and (e) the word embedding, corresponding to each pre-processed paragraph sentence word to obtain a concatenated feature vector for each pre-processed paragraph sentence word of the plurality of each pre-processed paragraph sentence words present in each pre-processed paragraph sentence of the plurality of pre-processed paragraph sentences associated with each fabrication procedure paragraph of the one or more fabrication procedure paragraphs;

passing the concatenated feature vector for each pre-processed paragraph sentence word of the plurality of each pre-processed paragraph sentence words present in each pre-processed paragraph sentence of the plurality of pre-processed paragraph sentences associated with each fabrication procedure paragraph of the one or more fabrication procedure paragraphs, to the trained named entity identification model, to obtain a predicted probability distribution for each pre-processed paragraph sentence of the plurality of pre-processed paragraph sentences associated with each fabrication procedure paragraph; and identifying the one or more entities out of the plurality of entities, for each pre-processed paragraph sentence of the plurality of pre-processed paragraph sentences associated with each fabrication procedure paragraph of the one or more fabrication procedure paragraphs, based on the predicted probability distribution for each pre-processed paragraph sentence of the plurality of pre-processed paragraph sentences associated with each fabrication procedure paragraph.

7. The method of claim 1, wherein the trained relation identification model is obtained by:

receiving (i) one or more entities identified for each training fabrication procedure paragraph sentence of a plurality of training fabrication procedure paragraph sentences associated with each training fabrication procedure paragraph of the plurality of training fabrication procedure paragraphs; (ii) a predefined relation annotation out of the first set of predefined relation annotations, for each predefined entity pair out of the one or more entities identified for each training fabrication procedure paragraph sentence of the plurality of training fabrication procedure paragraph sentences associated with each training fabrication procedure paragraph of the plurality of training fabrication procedure paragraphs;

extracting (i) one or more entity-level feature vectors and (ii) one or more entity-pair-level feature vectors, for each training fabrication procedure paragraph sentence of the plurality of training fabrication procedure paragraph sentences associated with each training fabrication procedure paragraph, wherein (i) the one or more entity-level feature vectors for each training fabrication procedure paragraph sentence, comprises a first set of features associated with each predefined entity of the one or more entities identified for the training fabrication procedure paragraph sentence, and (ii) the one or more entity-pair-level feature vectors for each training fabrication procedure paragraph sentence, comprises a second set of features associated with each predefined entity pair out of the one or more entities identified for the training fabrication procedure paragraph sentence; and training a hybrid neural network with: (i) one or more entity-level feature vectors and (ii) one or more entity-pair-level feature vectors, for each training fabrication procedure paragraph sentence of the plurality of training fabrication procedure paragraph sentences associated with each training fabrication procedure paragraph, to obtain the trained relation identification model, wherein training the hybrid neural network for each training fabrication procedure paragraph sentence, comprises:

passing, (i) the one or more entity-level feature vectors and (ii) the one or more entity-pair-level feature vectors, for the training fabrication procedure paragraph sentence, to the hybrid neural network, to obtain a predicted probability distribution for each predefined entity pair out of the one or more entities identified for the training fabrication procedure paragraph sentence;

minimizing a categorical cross-entropy loss function of the hybrid neural network, defined between (i) the predicted probability distribution for each predefined entity pair out of the one or more entities identified for the training fabrication procedure paragraph sentence, and (ii) an actual probability distribution for each predefined entity pair out of the one or more entities identified for the training fabrication procedure paragraph sentence, wherein the actual probability distribution for each predefined entity pair is defined from the predefined relation annotation corresponding to the predefined entity pair; and optimizing weights of the hybrid neural network, based on the categorical cross-entropy loss function of the hybrid neural network.

8. The method of claim 1, wherein identifying the one or more first predefined relations out of the first set of predefined relations, for each pre-processed paragraph sentence of the plurality of pre-processed paragraph sentences associated with each fabrication procedure paragraph of the one or more fabrication procedure paragraphs, by the trained relation identification model, using the one or more entities identified for each pre-processed paragraph sentence, further comprises:

extracting (i) one or more entity-level feature vectors and (ii) one or more entity-pair-level feature vectors, for each pre-processed paragraph sentence of the plurality of pre-processed paragraph sentences associated with each fabrication procedure paragraph of the one or more fabrication procedure paragraphs, wherein (i) the one or more entity-level feature vectors for each pre-processed paragraph sentence, comprises a first set of features associated with each predefined entity of the one or more entities identified for each pre-processed paragraph sentence, and (ii) the one or more entity-pair-level feature vectors for each pre-processed paragraph sentence, comprises a second set of features associated with each predefined entity pair out of the one or more entities identified for the pre-processed paragraph sentence;

passing, (i) the one or more entity-level feature vectors and (ii) the one or more entity-pair-level feature vectors, for each pre-processed paragraph sentence of the plurality of pre-processed paragraph sentences associated with each training fabrication procedure paragraph, to the trained relation identification model, to obtain a predicted probability distribution for each predefined entity pair out of the one or more entities identified for each pre-processed paragraph sentence; and identifying the one or more first predefined relations out of the first set of predefined relations, for each pre-processed paragraph sentence of the plurality of pre-processed paragraph sentences associated with each fabrication procedure paragraph, based on the predicted probability distribution for each predefined entity pair out of the one or more entities identified for the pre-processed paragraph sentence.

9. A system comprising:
a memory storing instructions;
one or more Input/Output (I/O) interfaces; and
one or more hardware processors coupled to the memory via the one or more I/O interfaces, wherein the one or more hardware processors are configured by the instructions to:
receive (i) a device category associated with a device fabrication, (ii) one or more device fabrication knowledge documents associated with the device category from a device fabrication knowledge repository, wherein each device fabrication knowledge document comprises a plurality of document paragraphs, wherein each document paragraph comprises one or more paragraph sentences, and each paragraph sentence comprises a plurality of paragraph sentence words;
pre-process each device fabrication knowledge document of the one or more device fabrication knowledge documents, to obtain: (i) a plurality of pre-processed document paragraphs, in a plain text format, (ii) a section header for each pre-processed document paragraph of the plurality of pre-processed document paragraphs, wherein each pre-processed document paragraph comprises a plurality of pre-processed paragraph sentences, and wherein each pre-processed paragraph sentence comprises a plurality of pre-processed paragraph sentence words;
identify one or more fabrication procedure paragraphs out of the plurality of pre-processed document paragraphs, by a trained fabrication procedure paragraph classification model, using the section header for each pre-processed document paragraph of the plurality of pre-processed document paragraphs, wherein each pre-processed document paragraph of the plurality of pre-processed document paragraphs is a fabrication procedure paragraph, if the pre-processed document paragraph comprises information related to a fabrication procedure;
identify one or more entities, for each pre-processed paragraph sentence of the plurality of pre-processed paragraph sentences associated with each fabrication procedure paragraph of the one or more fabrication procedure paragraphs, by a trained named entity identification model, wherein the plurality of entities are associated with a plurality of predefined concepts related to the fabrication procedure;
identify (i) one or more first predefined relations out of a first set of predefined relations, and (ii) one or more second predefined relations out of a second set of predefined relations, for each pre-processed paragraph sentence of the plurality of pre-processed paragraph sentences associated with each fabrication procedure paragraph of the one or more fabrication procedure paragraphs, by (i) a trained relation identification model, and (ii) a set of predefined pattern expressions, respectively, using the one or more entities identified for each pre-processed paragraph sentence;
identify device fabrication procedure for each fabrication procedure paragraph of the one or more fabrication procedure paragraphs, by a rule based unsupervised algorithm, using the one or more entities identified for each pre-processed paragraph sentence of the plurality of pre-processed paragraph sentences associated with each fabrication procedure paragraph, wherein the device fabrication procedure for each fabrication procedure paragraph, comprises a sequence of operations; and
generate an operation sequence knowledge graph for each fabrication procedure paragraph of the one or more fabrication procedure paragraphs, using (i) the one or more entities identified for each pre-processed paragraph sentence of the plurality of pre-processed paragraph sentences associated with each fabrication procedure paragraph of the one or more fabrication procedure paragraphs, (ii) (a) the one or more first predefined relations out of the first set of predefined relations, and (b) the one or more second predefined relations out of the second set of predefined relations, identified for each pre-processed paragraph sentence of the plurality of pre-processed paragraph sentences associated with each fabrication procedure paragraph of the one or more fabrication procedure paragraphs, and (iii) the device fabrication procedure for each fabrication procedure paragraph of the one or more fabrication procedure paragraphs, using a graph database tool.

10. The system of claim 9, wherein the one or more hardware processors are further configured to build an analytical platform to enable the device fabrication, using the operation sequence knowledge graph for each fabrication procedure paragraph of the one or more fabrication procedure paragraphs, in a graph search engine.

11. The system of claim 9, wherein the one or more hardware processors are configured to obtain the trained fabrication procedure paragraph classification model, by:
receiving (i) a plurality of training document paragraphs associated with the device category, in the plain text format, (ii) the section header for each training document paragraph of the plurality of training document paragraphs, and (iii) an annotation class for each training document paragraph of the plurality of training document paragraphs, wherein each training document paragraph comprises a plurality of training document paragraph sentences, and each training document paragraph sentence comprises a plurality of training document paragraph sentence words, and wherein the annotation class for each training document paragraph is one of: (a) the fabrication procedure paragraph, and (b) a non-fabrication procedure paragraph;
obtaining: (a) a paragraph text vector, (b) a dictionary feature vector, and (c) a section header feature vector, for each training document paragraph of the plurality of training document paragraphs, wherein:
(a) the paragraph text vector for each training document paragraph comprises an embedding for each training document paragraph sentence word of the plurality of training document paragraph sentence words corresponding to each training document paragraph sentence of the plurality of training document paragraph sentences corresponding to the training document paragraph;
(b) the dictionary feature vector for each training document paragraph is obtained by: (i) defining an initial dictionary feature vector with a plurality of predefined keywords, and (ii) assigning a Boolean value for each predefined keyword of the plurality of predefined keywords defined in the initial dictionary feature vector, based on presence of the predefined keyword in the training document paragraph; and
(c) the section header feature vector for each training document paragraph of the plurality of training document paragraphs, is obtained by: (i) defining an initial section header feature vector with a plurality of predefined section headers, and (ii) assigning the Boolean value for each predefined section header of the plurality of predefined section headers defined in the initial section header feature vector, based on matching of the predefined section header with the section header of the training document paragraph; and training a first bi-directional long short term memory (BiLSTM) network with: (i) (a) the paragraph text vector, (b) the dictionary feature vector, and (c) the section header feature vector, for each training document paragraph, at a time, of the plurality of training document paragraphs, and (ii) the annotation class for each training document paragraph of the plurality of training document paragraphs, to obtain the trained fabrication procedure paragraph classification model, wherein training the first BiLSTM network with each training document paragraph comprises:

passing the paragraph text vector corresponding to the training document paragraph, as an input to a bi-directional long short term memory (BiLSTM) layer of the first BiLSTM network, to learn a hidden state of a first training document paragraph sentence word and the hidden state of a last training document paragraph sentence word, present in the training document paragraph;

concatenating the dictionary feature vector and the section header feature vector, corresponding to the training document paragraph, with the hidden state of the first training document paragraph sentence word and the hidden state of the last training document paragraph sentence word, present in the training document paragraph, to obtain a concatenated feature vector of the training document paragraph;

passing the concatenated feature vector of the training document paragraph to a soft-max layer of the first BiLSTM network to obtain a predicted probability value of the training document paragraph;

minimizing a binary cross-entropy loss function of the first BiLSTM network, defined between the (i) the predicted probability value of the training document paragraph, and (ii) an actual probability value of the training document paragraph, wherein the actual probability value of the training document paragraph is defined from the annotation class corresponding to the training document paragraph; and optimizing weights of the first BiLSTM network, based on the binary cross-entropy loss function of the first BiLSTM network.

12. The system of claim 9, wherein the one or more hardware processors are configured to identify the one or more fabrication procedure paragraphs out of the plurality of pre-processed document paragraphs, by the trained fabrication procedure paragraph classification model, using the section header for each pre-processed document paragraph of the plurality of pre-processed document paragraphs, by:

obtaining: (a) a paragraph text vector, (b) a dictionary feature vector, and (c) a section header feature vector, for each pre-processed document paragraph of the plurality of pre-processed document paragraphs, wherein:

(a) the paragraph text vector for each pre-processed document paragraph comprises an embedding for each pre-processed paragraph sentence word of the plurality of pre-processed paragraph sentence words corresponding to each pre-processed paragraph sentence of the plurality of pre-processed paragraph sentences corresponding to the pre-processed document paragraph;

(b) the dictionary feature vector for each pre-processed document paragraph is obtained by: (i) defining an initial dictionary feature vector with a plurality of predefined keywords, and (ii) assigning a Boolean value for each predefined keyword of the plurality of predefined keywords defined in the initial dictionary feature vector, based on presence of the predefined keyword in the pre-processed document paragraph; and (c) the section header feature vector for each pre-processed document paragraph is obtained by: (i) defining an initial section header feature vector with a plurality of predefined section headers, and (ii) assigning the Boolean value for each predefined section header of the plurality of predefined section headers defined in the initial section header feature vector, based on matching of the predefined section header with the section header of the pre-processed document paragraph;

passing: (a) the paragraph text vector, (b) the dictionary feature vector, and (c) the section header feature vector, for each pre-processed document paragraph of the plurality of pre-processed document paragraphs, to the trained fabrication procedure paragraph classification model, to obtain a predicted probability value for each pre-processed document paragraph of the plurality of pre-processed document paragraphs; and identifying the one or more fabrication procedure paragraphs out of the plurality of pre-processed document paragraphs, based on the predicted probability value corresponding to each pre-processed document paragraph of the plurality of pre-processed document paragraphs.

13. The system of claim 9, wherein the one or more hardware processors are configured to obtain the trained named entity identification model, by:

receiving (i) a plurality of training fabrication procedure paragraphs, wherein each training fabrication procedure paragraph comprises a plurality of training fabrication procedure paragraph sentences, and each training fabrication procedure paragraph sentence comprises a plurality of training fabrication procedure paragraph sentence words, (ii) an entity annotation for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs;

obtaining: (a) a gazetteer feature vector, (b) a casing feature vector, (c) a part of speech (PoS) feature vector, (d) a character embedding vector, and (e) a word embedding, for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs, wherein:

(a) the gazetteer feature vector for each training fabrication procedure paragraph sentence word, is obtained by: (i) defining an initial gazetteer feature vector with a plurality of predefined concepts, and (ii) assigning a Boolean value for each predefined concept of the plurality of predefined concepts defined in the initial gazetteer feature vector, based on association of the predefined concept with the training fabrication procedure paragraph sentence word;
(b) the casing feature vector for each training fabrication procedure paragraph sentence word is a predefined casing type of one or more predefined casing types, associated with the training fabrication procedure paragraph sentence word;
(c) the PoS feature vector for each training fabrication procedure paragraph sentence word is a predefined PoS type of one or more predefined PoS types, associated with the training fabrication procedure paragraph sentence word;
(d) the character embedding vector for each training fabrication procedure paragraph sentence word is an array of character embeddings associated with each character present in the training fabrication procedure paragraph sentence word; and
(e) the word embedding for each training fabrication procedure paragraph sentence word is an embedding of the training fabrication procedure paragraph sentence word; and training a second bi-directional long short term memory (BiLSTM) network with (i) (a) the gazetteer feature vector, (b) the casing feature vector, (c) the part of speech (PoS) feature vector, (d) the character embedding vector, and (e) the word embedding, for each training fabrication procedure paragraph sentence word of the plurality of training fabrication procedure paragraph sentence words present in each training fabrication procedure paragraph sentence, at a time, of each training fabrication procedure paragraph of the plurality of training fabrication procedure paragraphs, and (ii) the entity annotation for each training fabrication procedure paragraph sentence word of the plurality of training fabrication procedure paragraph sentence words present in each training fabrication procedure paragraph sentence of each training fabrication procedure paragraph of the plurality of training fabrication procedure paragraphs, to obtain the trained named entity identification model, wherein training the second BiLSTM network with each training fabrication procedure paragraph comprises:

concatenating (a) the gazetteer feature vector, (b) the casing feature vector, (c) the part of speech (PoS) feature vector, (d) the character embedding vector, and (e) the word embedding, corresponding to each training fabrication procedure paragraph sentence word, to obtain a concatenated feature vector for each training fabrication procedure paragraph sentence word of the plurality of training fabrication procedure paragraph sentence words present in each training fabrication procedure paragraph sentence of the training fabrication procedure paragraph;

passing the concatenated feature vector for each training fabrication procedure paragraph sentence word of the plurality of training fabrication procedure paragraph sentence words present in each training fabrication procedure paragraph sentence of the training fabrication procedure paragraph, to a bi-directional long short term memory (BiLSTM) layer of the second BiLSTM network, to learn a hidden state for each training fabrication procedure paragraph sentence word of the plurality of training fabrication procedure paragraph sentence words present in each training fabrication procedure paragraph sentence of the training fabrication procedure paragraph;

passing the hidden state for each training fabrication procedure paragraph sentence word of the plurality of training fabrication procedure paragraph sentence words present in each training fabrication procedure paragraph sentence of the training fabrication procedure paragraph, to a conditional random field (CRF) layer of the second BiLSTM network, to obtain a predicted probability distribution, for each training fabrication procedure paragraph sentence of the training fabrication procedure paragraph;

maximizing a probability function of the second BiLSTM network, defined based on (i) the predicted probability distribution, for each training fabrication procedure paragraph sentence of the training fabrication procedure paragraph, and (i) an actual probability distribution for each training fabrication procedure paragraph sentence of the training fabrication procedure paragraph, wherein the actual probability distribution for each training fabrication procedure paragraph sentence of the training fabrication procedure paragraph, is defined from the entity annotation for each training fabrication procedure paragraph sentence word of the plurality of training fabrication procedure paragraph sentence words present in each training fabrication procedure paragraph sentence of the training fabrication procedure paragraph; and optimizing weights of the second BiLSTM network, based on the probability function of the second BiLSTM network.

14. The system of claim 9, wherein the one or more hardware processors are configured to identify the one or more entities out of the plurality of entities, for each pre-processed paragraph sentence of the plurality of pre-processed paragraph sentences associated with each fabrication procedure paragraph of the one or more fabrication procedure paragraphs, using the trained named entity identification model, by;

obtaining: (a) a gazetteer feature vector, (b) a casing feature vector, (c) a part of speech (PoS) feature vector, (d) a character embedding vector, and (e) a word embedding, for each pre-processed paragraph sentence word of the plurality of pre-processed paragraph sentence words present in each pre-processed paragraph sentence of the plurality of pre-processed paragraph sentences associated with each fabrication procedure paragraph of the one or more fabrication procedure paragraphs, wherein:
(a) the gazetteer feature vector for each pre-processed paragraph sentence word, is obtained by: (i) defining an initial gazetteer feature vector with a plurality of predefined concepts, and (ii) assigning a Boolean value for each predefined concept of the plurality of predefined concepts defined in the initial gazetteer feature vector, based on association of the predefined concept with the pre-processed paragraph sentence word;
(b) the casing feature vector for each pre-processed paragraph sentence word is a predefined casing type of one or more predefined casing types, associated with the pre-processed paragraph sentence word;

(c) the PoS feature vector for each pre-processed paragraph sentence word is a predefined PoS type of one or more predefined PoS types, associated with the pre-processed paragraph sentence word;

(d) the character embedding vector for pre-processed paragraph sentence word is an array of character embeddings associated with each character present in the pre-processed paragraph sentence word; and (e) the word embedding for each pre-processed paragraph sentence word is an embedding of the pre-processed paragraph sentence word;

concatenating (a) the gazetteer feature vector, (b) the casing feature vector, (c) the part of speech (PoS) feature vector, (d) the character embedding vector, and (e) the word embedding, corresponding to each pre-processed paragraph sentence word to obtain a concatenated feature vector for each pre-processed paragraph sentence word of the plurality of each pre-processed paragraph sentence words present in each pre-processed paragraph sentence of the plurality of pre-processed paragraph sentences associated with each fabrication procedure paragraph of the one or more fabrication procedure paragraphs;

passing the concatenated feature vector for each pre-processed paragraph sentence word of the plurality of each pre-processed paragraph sentence words present in each pre-processed paragraph sentence of the plurality of pre-processed paragraph sentences associated with each fabrication procedure paragraph of the one or more fabrication procedure paragraphs, to the trained named entity identification model, to obtain a predicted probability distribution for each pre-processed paragraph sentence of the plurality of pre-processed paragraph sentences associated with each fabrication procedure paragraph; and identifying the one or more entities out of the plurality of entities, for each pre-processed paragraph sentence of the plurality of pre-processed paragraph sentences associated with each fabrication procedure paragraph of the one or more fabrication procedure paragraphs, based on the predicted probability distribution for each pre-processed paragraph sentence of the plurality of pre-processed paragraph sentences associated with each fabrication procedure paragraph.

15. The system of claim 9, wherein the one or more hardware processors are configured to obtain the trained relation identification model, by:

receiving (i) one or more entities identified for each training fabrication procedure paragraph sentence of a plurality of training fabrication procedure paragraph sentences associated with each training fabrication procedure paragraph of the plurality of training fabrication procedure paragraphs; (ii) a predefined relation annotation out of the first set of predefined relation annotations, for each predefined entity pair out of the one or more entities identified for each training fabrication procedure paragraph sentence of the plurality of training fabrication procedure paragraph sentences associated with each training fabrication procedure paragraph of the plurality of training fabrication procedure paragraphs;

extracting (i) one or more entity-level feature vectors and (ii) one or more entity-pair-level feature vectors, for each training fabrication procedure paragraph sentence of the plurality of training fabrication procedure paragraph sentences associated with each training fabrication procedure paragraph, wherein (i) the one or more entity-level feature vectors for each training fabrication procedure paragraph sentence, comprises a first set of features associated with each predefined entity of the one or more entities identified for the training fabrication procedure paragraph sentence, and (ii) the one or more entity-pair-level feature vectors for each training fabrication procedure paragraph sentence, comprises a second set of features associated with each predefined entity pair out of the one or more entities identified for the training fabrication procedure paragraph sentence; and training a hybrid neural network with: (i) one or more entity-level feature vectors and (ii) one or more entity-pair-level feature vectors, for each training fabrication procedure paragraph sentence of the plurality of training fabrication procedure paragraph sentences associated with each training fabrication procedure paragraph, to obtain the trained relation identification model, wherein training the hybrid neural network for each training fabrication procedure paragraph sentence, comprises:

passing, (i) the one or more entity-level feature vectors and (ii) the one or more entity-pair-level feature vectors, for the training fabrication procedure paragraph sentence, to the hybrid neural network, to obtain a predicted probability distribution for each predefined entity pair out of the one or more entities identified for the training fabrication procedure paragraph sentence;

minimizing a categorical cross-entropy loss function of the hybrid neural network, defined between (i) the predicted probability distribution for each predefined entity pair out of the one or more entities identified for the training fabrication procedure paragraph sentence, and (ii) an actual probability distribution for each predefined entity pair out of the one or more entities identified for the training fabrication procedure paragraph sentence, wherein the actual probability distribution for each predefined entity pair is defined from the predefined relation annotation corresponding to the predefined entity pair; and optimizing weights of the hybrid neural network, based on the categorical cross-entropy loss function of the hybrid neural network.

16. The system of claim 9, wherein the one or more hardware processors are configured to identify the one or more first predefined relations out of the first set of predefined relations, for each pre-processed paragraph sentence of the plurality of pre-processed paragraph sentences associated with each fabrication procedure paragraph of the one or more fabrication procedure paragraphs, by the trained relation identification model, using the one or more entities identified for each pre-processed paragraph sentence, by:

extracting (i) one or more entity-level feature vectors and (ii) one or more entity-pair-level feature vectors, for each pre-processed paragraph sentence of the plurality of pre-processed paragraph sentences associated with each fabrication procedure paragraph of the one or more fabrication procedure paragraphs, wherein (i) the one or more entity-level feature vectors for each pre-processed paragraph sentence, comprises a first set of features associated with each predefined entity of the one or more entities identified for each pre-processed paragraph sentence, and (ii) the one or more entity-pair-level feature vectors for each pre-processed paragraph sentence, comprises a second set of features associated with each predefined entity pair out of the one or more entities identified for the pre-processed paragraph sentence;

passing, (i) the one or more entity-level feature vectors and (ii) the one or more entity-pair-level feature vectors, for each pre-processed paragraph sentence of the plurality of pre-processed paragraph sentences associated with each training fabrication procedure paragraph, to the trained relation identification model, to obtain a predicted probability distribution for each predefined entity pair out of the one or more entities identified for each pre-processed paragraph sentence; and identifying the one or more first predefined relations out of the first set of predefined relations, for each pre-processed paragraph sentence of the plurality of pre-processed paragraph sentences associated with each fabrication procedure paragraph, based on the predicted probability distribution for each predefined entity pair out of the one or more entities identified for the pre-processed paragraph sentence.

17. A computer program product comprising a non-transitory computer readable medium having a computer readable program embodied therein, wherein the computer readable program, when executed on a computing device, causes the computing device to:

receive (i) a device category associated with a device fabrication, (ii) one or more device fabrication knowledge documents associated with the device category from a device fabrication knowledge repository, wherein each device fabrication knowledge document comprises a plurality of document paragraphs, wherein each document paragraph comprises one or more paragraph sentences, and each paragraph sentence comprises a plurality of paragraph sentence words;

pre-process each device fabrication knowledge document of the one or more device fabrication knowledge documents, to obtain: (i) a plurality of pre-processed document paragraphs, in a plain text format, (ii) a section header for each pre-processed document paragraph of the plurality of pre-processed document paragraphs, wherein each pre-processed document paragraph comprises a plurality of pre-processed paragraph sentences, and wherein each pre-processed paragraph sentence comprises a plurality of pre-processed paragraph sentence words;

identify one or more fabrication procedure paragraphs out of the plurality of pre-processed document paragraphs, by a trained fabrication procedure paragraph classification model, using the section header for each pre-processed document paragraph of the plurality of pre-processed document paragraphs, wherein each pre-processed document paragraph of the plurality of pre-processed document paragraphs is a fabrication procedure paragraph, if the pre-processed document paragraph comprises information related to a fabrication procedure;

identify one or more entities, for each pre-processed paragraph sentence of the plurality of pre-processed paragraph sentences associated with each fabrication procedure paragraph of the one or more fabrication procedure paragraphs, by a trained named entity identification model, wherein the plurality of entities are associated with a plurality of predefined concepts related to the fabrication procedure;

identify (i) one or more first predefined relations out of a first set of predefined relations, and (ii) one or more second predefined relations out of a second set of predefined relations, for each pre-processed paragraph sentence of the plurality of pre-processed paragraph sentences associated with each fabrication procedure paragraph of the one or more fabrication procedure paragraphs, by (i) a trained relation identification model, and (ii) a set of predefined pattern expressions, respectively, using the one or more entities identified for each pre-processed paragraph sentence;

identify device fabrication procedure for each fabrication procedure paragraph of the one or more fabrication procedure paragraphs, by a rule based unsupervised algorithm, using the one or more entities identified for each pre-processed paragraph sentence of the plurality of pre-processed paragraph sentences associated with each fabrication procedure paragraph, wherein the device fabrication procedure for each fabrication procedure paragraph, comprises a sequence of operations;

generate an operation sequence knowledge graph for each fabrication procedure paragraph of the one or more fabrication procedure paragraphs, using (i) the one or more entities identified for each pre-processed paragraph sentence of the plurality of pre-processed paragraph sentences associated with each fabrication procedure paragraph of the one or more fabrication procedure paragraphs, (ii) (a) the one or more first predefined relations out of the first set of predefined relations, and (b) the one or more second predefined relations out of the second set of predefined relations, identified for each pre-processed paragraph sentence of the plurality of pre-processed paragraph sentences associated with each fabrication procedure paragraph of the one or more fabrication procedure paragraphs, and (iii) the device fabrication procedure for each fabrication procedure paragraph of the one or more fabrication procedure paragraphs, using a graph database tool; and build an analytical platform to enable the device fabrication, using the operation sequence knowledge graph for each fabrication procedure paragraph of the one or more fabrication procedure paragraphs, in a graph search engine.

* * * * *